April 16, 1946.  N. R. BROWNYER  2,398,407
POWER TRANSMITTING MECHANISM
Filed July 13, 1944  7 Sheets-Sheet 1
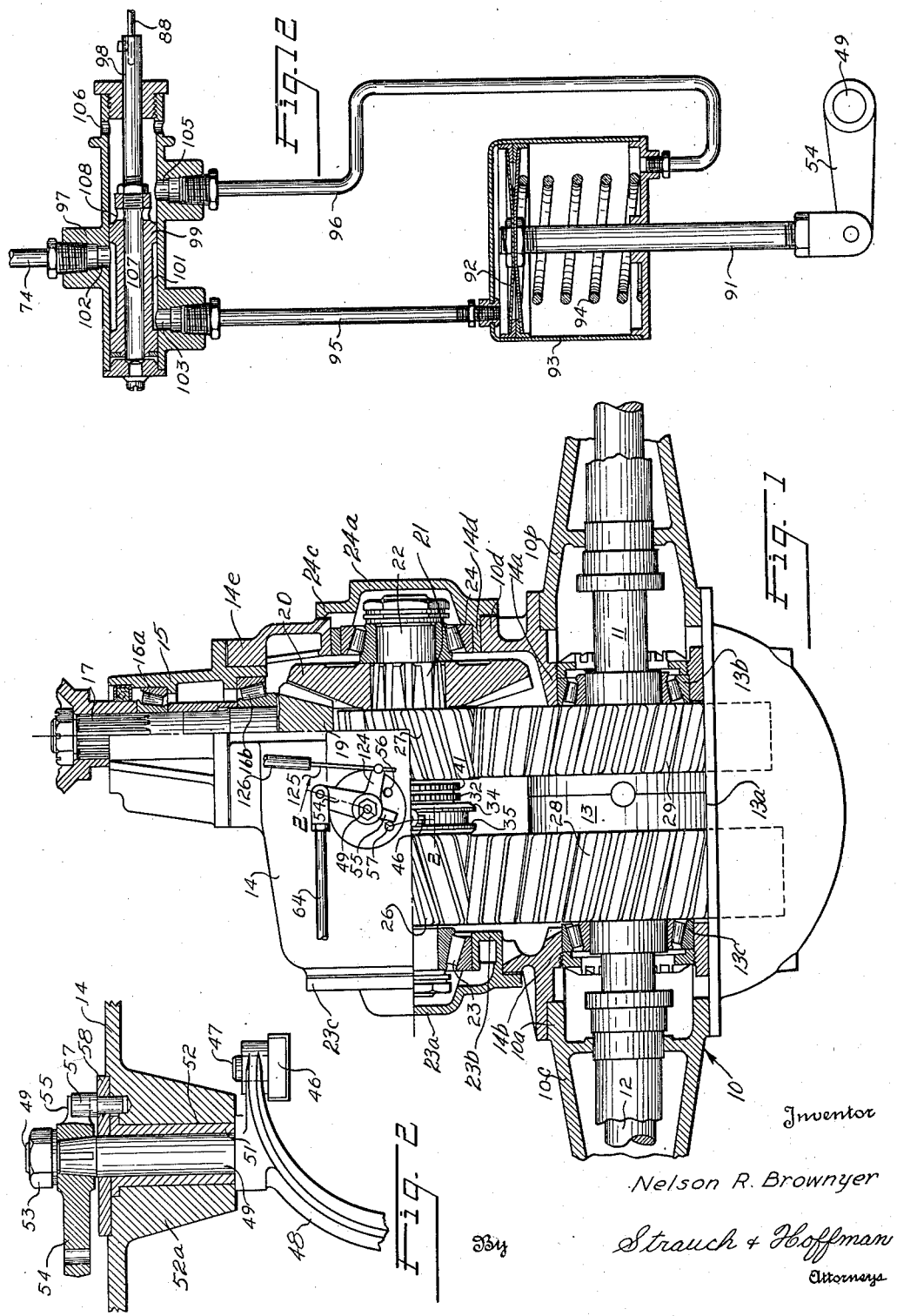
Inventor
Nelson R. Brownyer
By Strauch & Hoffman
Attorneys

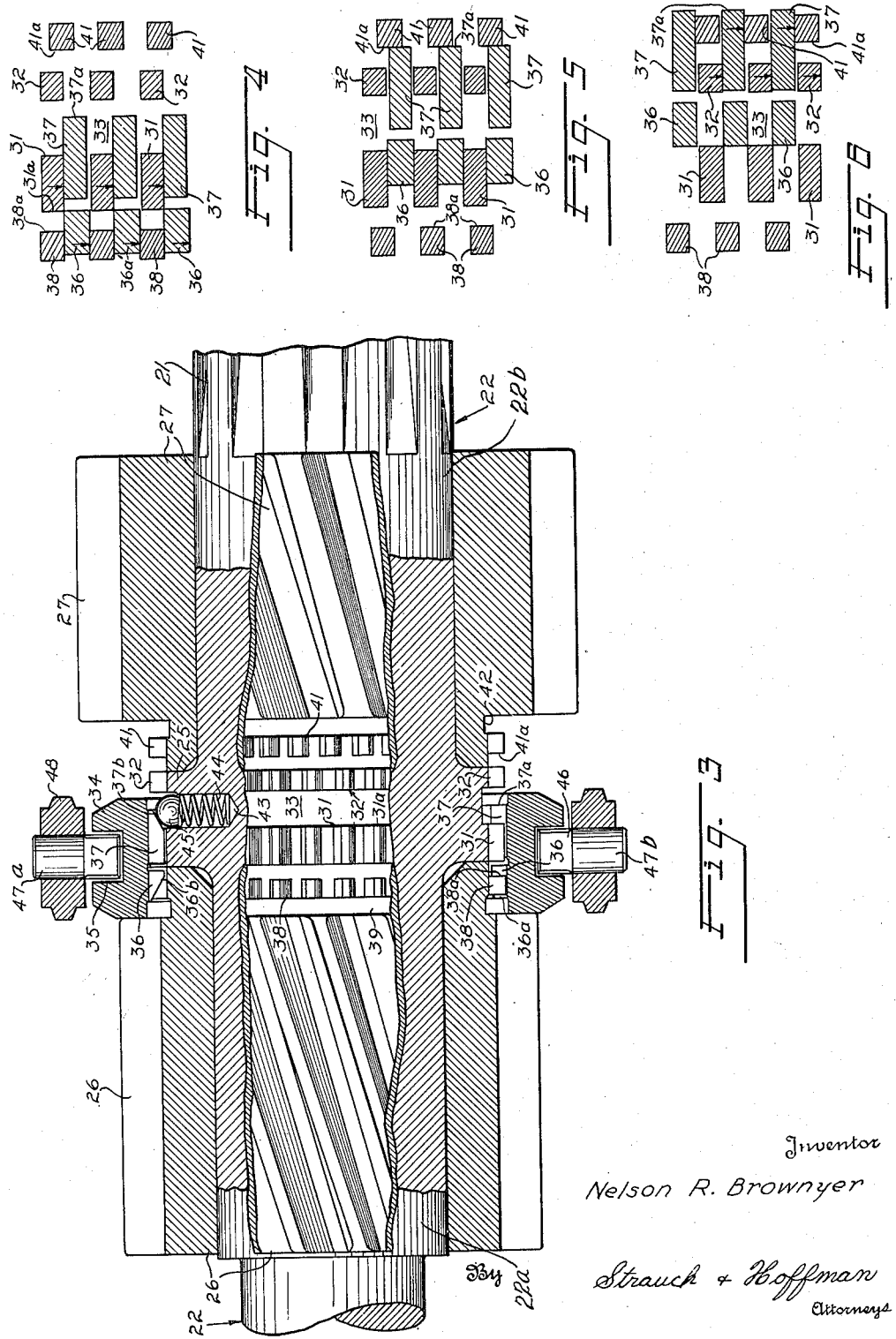

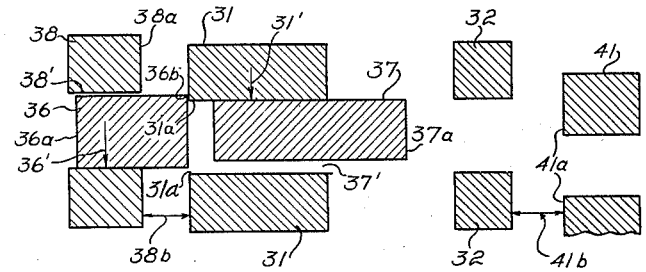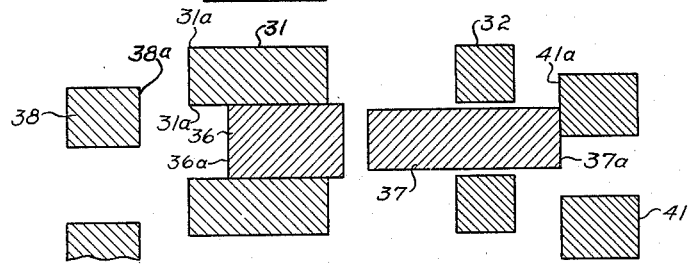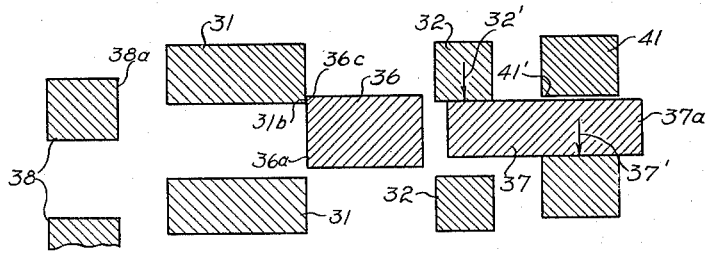

April 16, 1946. N. R. BROWNYER 2,398,407
POWER TRANSMITTING MECHANISM
Filed July 13, 1944 7 Sheets-Sheet 4
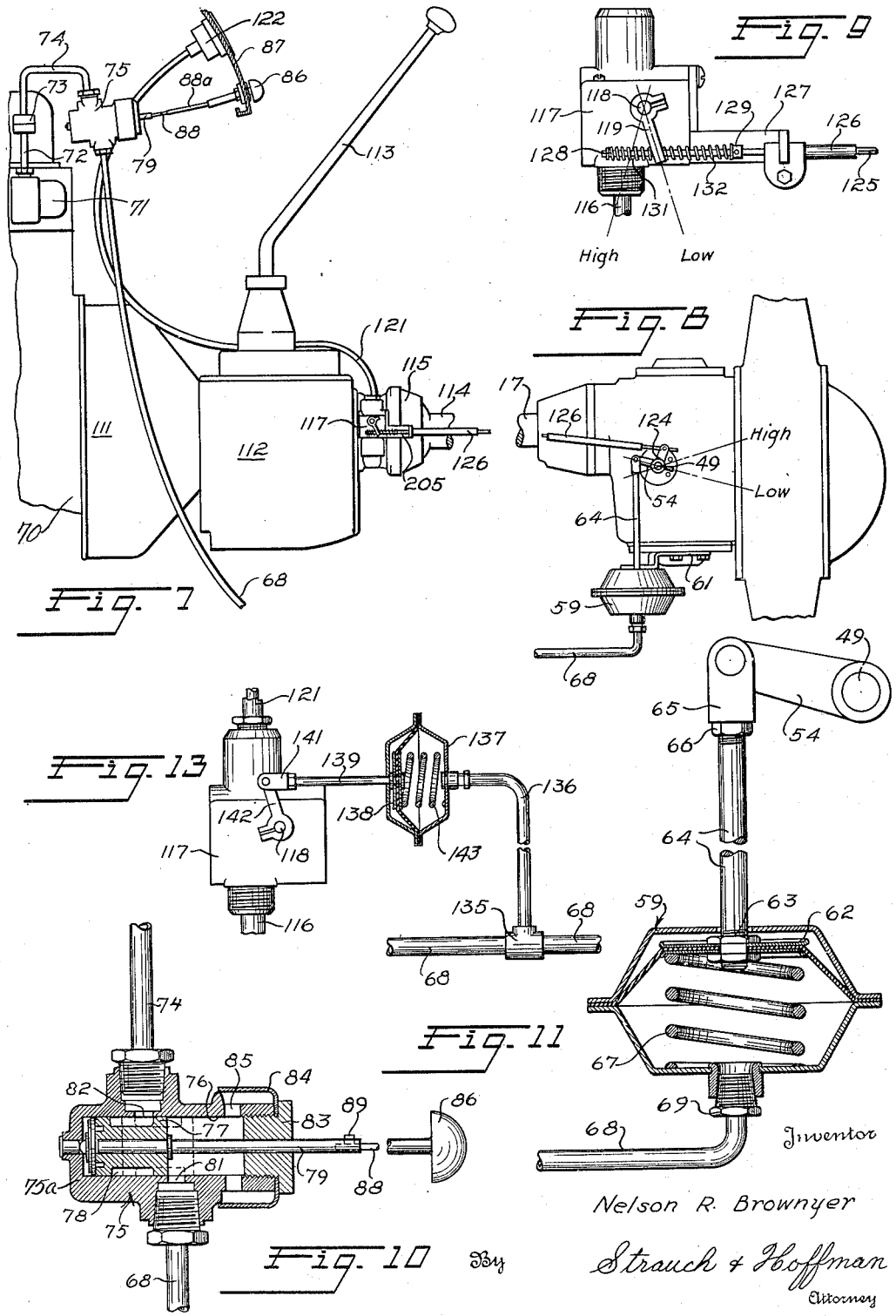

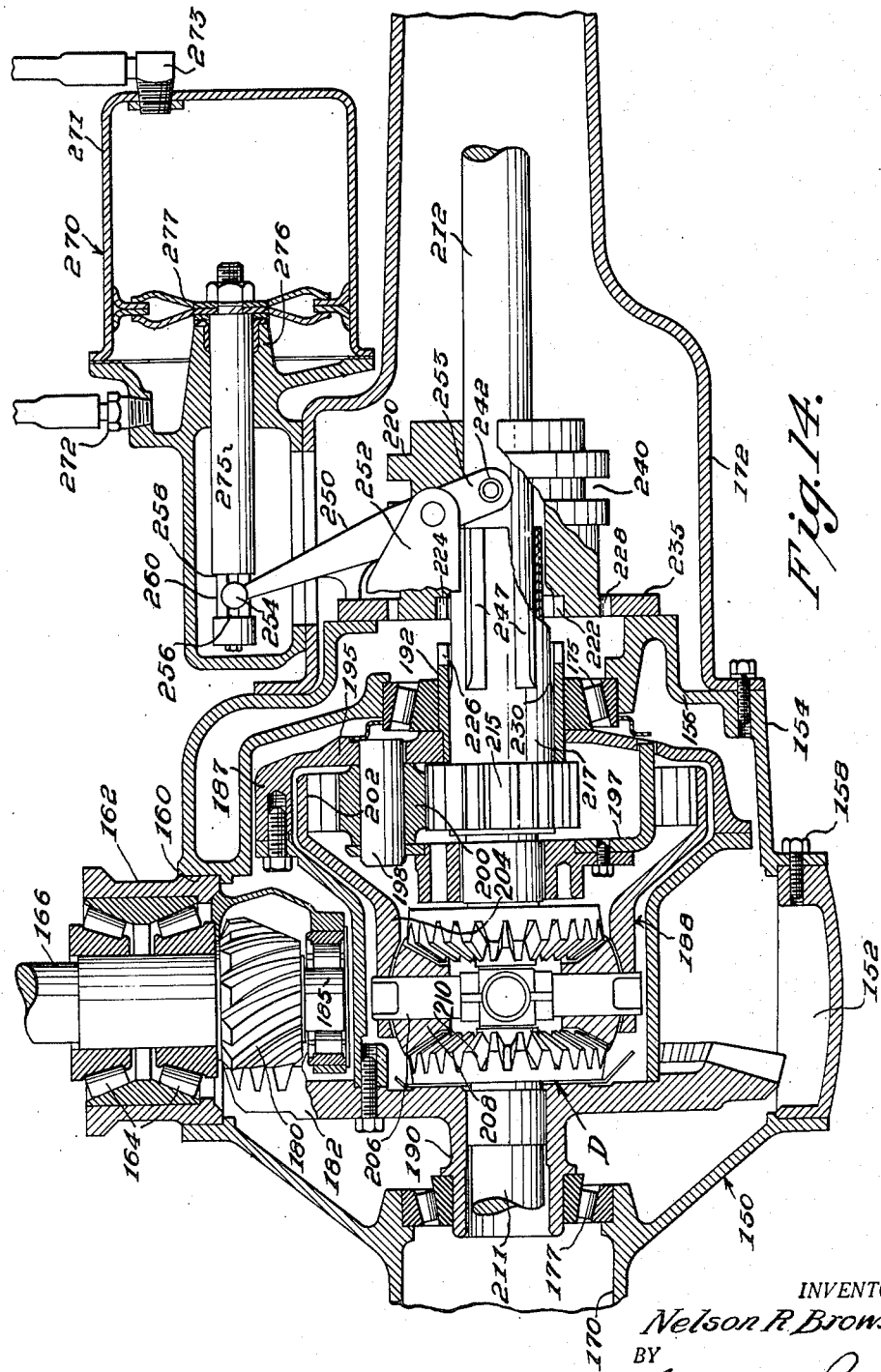

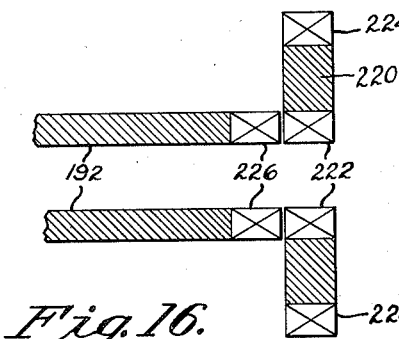
Fig. 16.
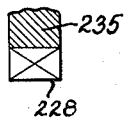
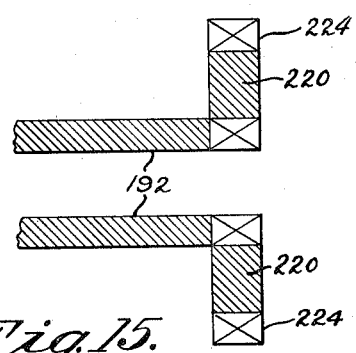
Fig. 15.
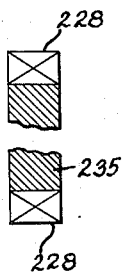
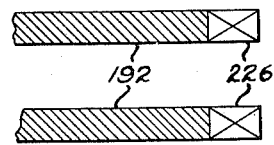
Fig. 17.
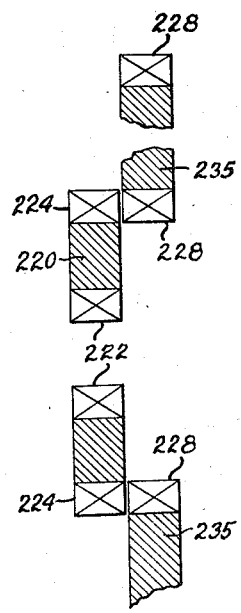

April 16, 1946.    N. R. BROWNYER    2,398,407
POWER TRANSMITTING MECHANISM
Filed July 13, 1944    7 Sheets-Sheet 7

INVENTOR.
Nelson R. Brownyer
BY
Strauch & Hoffman
Attorneys

Patented Apr. 16, 1946

2,398,407

UNITED STATES PATENT OFFICE 2,398,407

POWER TRANSMITTING MECHANISM

Nelson R. Brownyer, Birmingham, Mich., assignor to The Timken-Detroit Axle Company, Detroit, Mich., a corporation of Ohio

REISSUED
JUL 27 1948

Application July 13, 1944, Serial No. 544,716

19 Claims. (Cl. 192—48)

The present invention relates to power transmission mechanisms and to controls for such mechanisms and is a continuation-in-part of my application, Serial No. 387,977, filed April 10, 1941, for Power transmission mechanism. More particularly, the invention relates to power operated multiple speed power transmissions incorporated in axles for internal combustion engine powered vehicles, although it is not limited to such use, and may be advantageously employed wherever power is to be selectively transmitted at two or more different speed ratios.

Early manually shifted automotive speed changing transmissions incorporated in multi-speed axles comprised comparatively simple mechanical toothed clutching devices, but to change their speed ratios without clashing or stripping the gears required much experience and a high degree of skill and even a skilled operator could not always make a shift without damage to the mechanism.

The difficulty is greatly increased in two speed truck axles, because of the large rotational inertia of the parts involved. The use of such multi-speed mechanism has also necessitated the addition of control levers to the crowded modern truck cabs, cramping the driving space, and increasing the difficulties and hazards of driving. In spite of these difficulties, however, such two speed axles have gone into rapidly increasing use in recent years because they may be readily installed in place of standard truck axles, and their use doubles the number of speed ratios obtainable with the conventional truck transmissions only, thus eliminating the need for more complicated multiple speed transmissions in heavy trucking service and permitting the low cost conversion of standard low priced comparatively low powered trucks for heavy duty use.

Early efforts to minimize such shifting difficulties followed the obvious course of trying to make the meshing of the teeth easier by increasing the clearances between the engaging teeth, chamfering or rounding off the tooth corners, tapering the teeth and/or making alternate engaging clutch teeth long and short, as exemplified in Patent No. 2,183,667, issued Dec. 19, 1939, to L. R. Buckendale for Dual ratio drive axle. These expedients have failed to solve the problem because they tend to permit the clutch parts to engage readily before their speeds are synchronized, causing severe jerks and shocks, and subjecting the entire driving train to severe strains resulting in premature failures of the associated parts.

To overcome these difficulties, relatively vast sums of money and amounts of time were then spent to develop complicated and costly clutch synchronizing devices to synchronize the clutch parts prior to engagement, and thereby reduce wear and tear on the mechanisms incident to shifting, especially by careless operators. While such synchronizing devices facilitate shifting and have been generally adopted in conventional types of automotive transmissions, because of their added complications and costs, they have not been applied in the two-speed truck axles heretofore on the market.

Recently, however, a demand has arisen for the application of automatic or semi-automatic power shifting mechanisms to two-speed axles which give the driver no opportunity to even attempt, by the exercise of necessary skill, to mesh the gears without shock or clash.

To meet this situation, it has heretofore been deemed necessary to incorporate synchronizing devices in power shifted two speed axles, and then to provide complicated delayed action controls to prevent premature engagement of the parts before the synchronizer could become effective, as disclosed in Harper et al. Patent No. 2,071,165, granted February 16, 1937. This patent shows a power shift embodying a frictional synchronizer clutch and a delayed action control for the vacuum cylinder which causes a predetermined dwell or lag during the shift operation, to permit synchronization to take place. This type of axle has gone into use as optional equipment on pleasure cars provided with a control valve interconnected with the clutch pedal to insure proper shifting. These controls are costly, introduce mechanical complications, and have not as yet gone into standard production for any automotive use.

Instead of making the clutch members easy to engage, and then providing complicated and costly synchronizing and control devices to prevent premature engagement, I have discovered that by making the interengaging clutch teeth difficult to engage, through the use of smooth, parallel abutting ends having sharp corners, properly restricted engaging clearances, and properly proportioned engaging and disengaging pressures, toothed clutch constructions may be produced which can be shifted silently and without shock, either manually or by power means, under any conditions of vehicle speed and load, and without the need of any form of friction clutch. When the clutch members constructed in accordance with my invention are rotating relatively and their parallel tooth ends are brought into engagement with a force whose magnitude bears a proper relationship to the sizes of the parts and the area of the tooth ends, I have found in practice that the tooth ends smoothly rub on each other and remain out of meshing engagement until their speeds are synchronized. At the moment of substantial synchronism they mesh without shock.

In test trucks equipped with a two-speed axle having my improved vacuum operated clutch, many shifts have been repeatedly carried out under all possible operating conditions without operating the clutch pedal, and yet it was found substantially impossible to produce noise or shock of any kind under normal operating conditions.

In Maybach Patent No. 1,719,188, granted July 2, 1929, a transmission is disclosed allegedly shiftable under certain conditions of relative rotation between the parts, without disengaging the vehicle clutch. A resilient connection is interposed between the shift lever and the clutch collar, inclined teeth are employed, so that the lever may be shifted at random to pre-select the gear ratio, and shift of the clutch allegedly occurs automatically later on by the resilient means, upon synchronism of the parts. The inclined tooth ends of the gears and clutch caused a rattling action to take place until the parts were synchronized. As will be apparent, rapid wear of the sharp inclined tooth corners would occur, and the one-way inclined teeth will grab with a violent shock unless the parts are rotated relatively to each other during the synchronizing operation in the directions disclosed by Maybach. And, as pointed out in Maybach's later Patent No. 1,891,678, the parts of the construction of Patent 1,719,188 did not always properly engage, allegedly due to variations in the throttling of the engine. Maybach proposed to correct this defect in Patent No. 1,891,678 by interconnecting the throttle and shift mechanism. This resulted in a complicated construction which, so far as I am aware, has not gone into commercial use.

It is accordingly the primary object of this invention to provide a multi-speed transmission mechanism having a novel shifting assembly which enables the desired speed ratio to be selected at any time, and without requiring disengagement of the vehicle clutch, and which will automatically and silently shift into the selected speed upon momentary interruption of torque delivery.

A further object is to provide a change speed mechanism embodying toothed mating members having parallel tooth ends, together with means for urging them into engagement by forces whose magnitude bears such relation to the area of the parallel tooth ends, that the latter will smoothly slide upon each other but will not engage until synchronization is substantially complete.

Another object is to provide a power shift mechanism embodying members having parallel-ended confronting teeth and blocking means for positively retaining them in full mesh so long as power is transmitted between them in either direction, and to so proportion the length of the teeth and the area of their ends that, when a torque interruption occurs, the power shifter will readily disengage the teeth, and when shifted in the opposite direction the teeth will abut and block completion of the shift until synchronization is effected.

A further object is to provide a transmission assembly embodying a novel power operated shifting mechanism enabling the desired available gear ratio to be pre-selected at any time during operation and which will subsequently automatically carry out the shift into the pre-selected speed ratio under the control of the operator, but only when the parts are synchronized, without shock, the parts being so designed that it is immaterial which direction of relative rotation occurs between them during the synchronizing operation.

A further object is to provide a speed change mechanism with power operated means for selectively shifting it from one speed ratio to another, and having means for automatically shifting it into one speed ratio in the event of power failure.

A further object is to provide multi-speed axle equipped vehicles with novel control mechanisms for automatically changing the speed ratio of the speedometer drive to correspond to the speed ratio of the axle.

Another object is to provide a two speed shift clutch which is shiftable into mesh with a pair of gears, with a shifting mechanism which will exert a relatively heavy clutch disengaging force and a relatively light engaging force in which there is a definite staging of pressures or a sharp drop in pressure after the clutch collar has been disengaged from either gear.

A further object is to provide a two speed shift mechanism embodying a clutch collar which is meshable with a pair of gears, and means for exerting positive or non-yielding disengaging forces upon the clutch collar, and for exerting yielding forces of lower magnitude for bringing the clutch collar into mesh with the gears, in both directions of shift.

Further objects will become apparent as the specification proceeds in conjunction with the annexed drawings, and from the appended claims.

In the drawings:

Figure 1 is a top view of a two speed automotive axle embodying the invention, certain parts being broken away and shown in cross section to more clearly illustrate the construction;

Figure 2 is a fragmental sectional view, taken substantially on the line 2—2 of Figure 1, looking in the direction of the arrows;

Figure 3 is an enlarged longitudinal sectional view of the speed change mechanism of Figure 1, as it appears when removed from the casing, and with the parts in low gear;

Figure 4 is a diagrammatic view showing the cooperating clutch teeth of the collar, the shaft and the drive gears of the mechanism shown in Figure 1, as they appear when the device is operating in low speed and with the collar locked against shifting;

Figure 4A is a view similar to Figure 4, on a larger scale;

Figure 5 is a view similar to Figure 4, but shows the parts in the position they assume when the collar teeth are sliding on the clutch teeth of the high speed gear, prior to shifting into high speed;

Figure 5A is a view similar to Figure 5, on a larger scale;

Figure 6 is a view similar to Figure 4, but shows the parts in high gear and with the collar locked against shifting;

Figure 6A is a view similar to Figure 6, on a larger scale;

Figure 7 is a diagrammatic view of a fragmentary portion of a vehicle showing a novel control mechanism constructed according to the invention applied thereto;

Figure 8 is a top plan view supplementing Figure 7, and illustrates the manner in which the controls are associated with the rear axle;

Figure 9 is a side elevational view, on an enlarged scale, of the speedometer change speed gear shown in Figure 7;

Figure 10 is an enlarged sectional view of the vacuum control valve shown in Figure 7;

Figure 11 is an enlarged sectional view of the vacuum operated control mechanism shown in Figure 8;

Figure 12 is a sectional view of a modified valve and vacuum cylinder assembly for controlling the transmission, also forming part of the invention;

Figure 13 is an elevational view with parts in section of a modified speedometer control also forming part of the invention;

Figure 14 is a horizontal sectional view of a planetary axle embodying the invention, showing the parts in the overdrive position;

Figure 15 is a diagrammatic sectional view of a fragmental portion of mechanism shown in Figure 14 with the parts in overdrive position;

Figure 16 is a view similar to Figure 15 but shows the parts shifted out of overdrive position, into neutral position;

Figure 17 is a view similar to Figure 16, but shows the parts as they are about to be shifted into the direct drive position;

Figure 18:
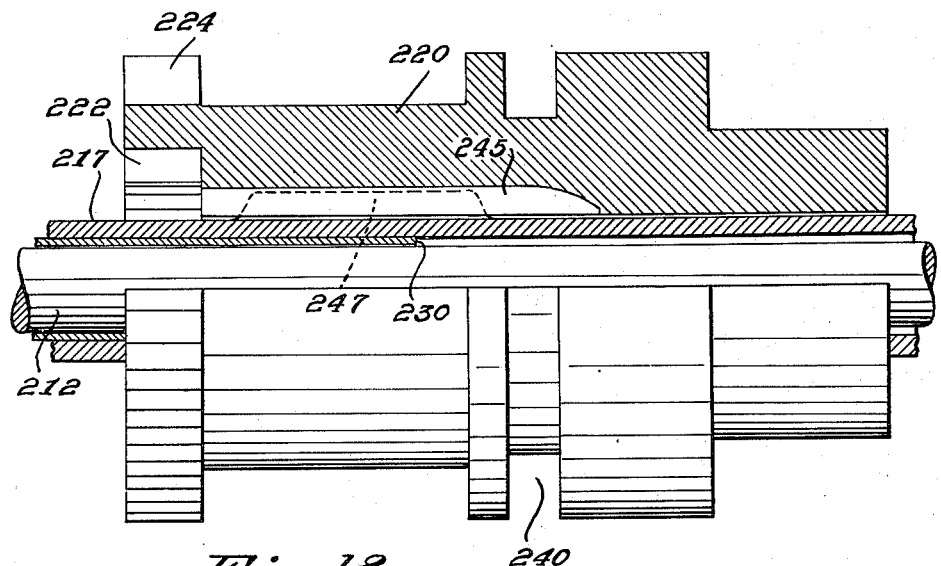
Figure 18 is a longitudinal sectional view on an enlarged scale of the shiftable toothed collar shown in Figure 14.
Figure 19:
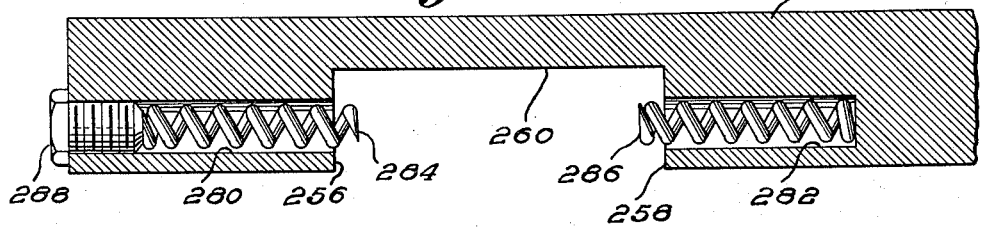
Figure 19 is a longitudinal sectional view on an enlarged scale of a fragmentary portion of the shift rod shown in Figure 14.

With continued reference to the drawings and particularly to Figures 1 and 3, wherein the improved shifting mechanism is shown embodied in a two speed, double reduction drive axle for an automotive vehicle, the numeral 10 indicates the axle housing having an enlarged center portion 10a from which the hollow arms 10b and 10c extend. The arm 10b incloses a rotatable axle shaft 11 while the arm 10c incloses a similar shaft 12. Suitable road wheels (not illustrated) are journalled on the outer ends of the arms 10b and 10c and the shafts 11 and 12 are drivingly connected to respective wheels in a conventional or desired manner.

At their inner ends the shafts 11 and 12 are operatively connected with a differential mechanism generally indicated at 13 which may be of the form illustrated and described in Buckendale Patent 2,183,667, referred to above. This differential mechanism includes a cage 13a having reduced cylindrical end portions journalled by anti friction bearings 13b and 13c in bearing legs 14a and 14b formed in a gear carrier case 14 in the manner more fully disclosed in the Buckendale Patent 2,183,667 referred to.

The gear carrier case is secured to the enlarged center portion 10a of the axle housing by means of suitable bolts or screws passing through the piloted bolting flanges 10d and 14d.

At its end opposite flange 14d carrier case 14 provides an apertured cylindrical boss 14e which receives a piloted bearing cage 15 in which are mounted two spaced anti friction roller bearings 16a and 16b which support the axle carried propeller shaft section 17. This shaft has integrally formed on its inner end a beveled pinion gear 19 which meshes with a beveled ring gear 20 fixed on a splined portion 21 of a cross shaft or counter shaft 22.

Cross shaft 22 has its axis substantially at right angles to the axis of propeller shaft section 17 and may, if desired, be disposed below the propeller shaft section, in which case the gears 19 and 20 would be hypoid gears. The cross shaft is journalled in the gear carrier case 14 by having its reduced end portions mounted in the anti friction roller bearings 23 and 24. The bearing 23 is mounted in a cap or cover member 23a which has a cylindrical boss portion 23b piloted in an apertured annular boss formed on the side of the gear carrier 14 and a bolting flange 23c secured to the boss by suitable bolts or screws (not illustrated).

The bearing 24 is similarly mounted in a cap or cover member 24a having a cylindrical boss portion 24b piloted in an apertured annular boss on the gear carrier and a bolting flange 24c secured to the carrier boss by suitable bolts or screws (not illustrated). The bearings 23 and 24 are capable of taking thrust or axial loads as well as radial loads and may be adjusted by the caps 23a and 24a to support the cross shaft 22 against endwise movement.

The cross shaft 22, as particularly shown in Figure 3, has two gear journal portions 22a and 22b separated by an enlarged center portion 25 provided with peripheral clutch teeth later to be described in detail.

As a sub assembly the shaft 22 carries, in addition to the bearings 23 and 24 and the beveled ring gear 20, a small diameter spur gear 26 journalled on the shaft portion 22a, a large diameter spur gear 27 journalled on the shaft portion 22b, and an internally toothed annular clutch collar 34 slidably mounted on the enlarged shaft portion 25 and selectively operatively engageable with the spur gears 26 and 27 in a manner to be later described in detail.

When the above described cross shaft sub assembly is embodied in the operative assembly shown in Figure 1 the spur gear 26 constantly meshes with a cooperating spur gear 28 mounted on the differential housing 13a at one end thereof while the gear 27 constantly meshes with a corresponding spur gear 29 mounted on the differential housing at the opposite end thereof from gear 28.

From the description so far it is apparent that when the propeller shaft section 17 is driven by a suitable power source, such as the automotive engine 70 of Figure 7 driving through the conventional friction clutch 111, change speed transmission 112 provided with manual shift lever 113, propeller shaft 114 and universal joints, one of which is illustrated at 115, the pinion gear 19 meshing with the bevel ring gear 20 will drive the cross shaft 22 and the clutch collar 34. If the clutch collar is operatively engaged with the gear 26 the drive will continue through the gear 26 and meshing gear 28 to the differential cage or housing 13a and through the differential mechanism to the axle shafts 11 and 12, providing a low speed gear drive for the axle. If, on the other hand, clutch collar 34 is operatively engaged with spur gear 27, the drive will be from the cross shaft 22 through gears 27 and 29 to the differential cage 13a and through the differential mechanism to the axle shafts 11 and 12.

In the illustrated arrangement the clutch collar 34 has only two operative positions, in one of which it engages the gear 26 and in the other of which it engages the gear 27. However, if it were desired to provide for operating the axle as a dead axle, the arrangement could be modified to provide a third operative position in which the collar would be held in a neutral or centered position out of engagement with both of the gears 26 and 27.

Figures 2 and 7 to 12 inclusive show suitable means for selectively engaging the clutch collar with the gears 26 and 27.

As shown in Figure 2 a pin or shaft 49 is rotatably mounted in a bushing 52 secured in a boss 52a formed internally of the gear carrier 14, in position such that its axis is at right angles to but offset from the axis of cross shaft 22. Within the gear carrier shaft 49 carries a yoke 48 which partly surrounds the clutch collar 34 and is provided at its ends with swivelled blocks 47a and 47b of T-shaped cross section which extend into an annular groove 35 provided in the outer surface of the clutch collar 34. With this arrangement rotation of shaft 49 will swing the yoke 48 and move clutch collar 34 along shaft 22 between the two operative positions of the clutch collar.

The pin or shaft 49 extends through the top wall of the gear carrier 14 and is provided externally of the carrier with a lever 54 secured thereon by a nut 53. Shaft rotating movements of the lever are limited by a stop finger 55 formed on the lever and engageable with a pair of eccentric headed pins 56 and 57.

When the parts just described are assembled, lever 54 is rocked back and forth to shift the clutch collar into its high and low speed positions, and the positions of the lever for each shifted position of the clutch collar observed, and the yoke so located as to dispose blocks 46 centrally with respect to groove 35 and free from rubbing engagement.

When the high and low speed positions of lever 54 have been properly located from the high and low speed positions of the clutch collar, a pair of pins 56 and 57, having eccentric heads, are rotated into proper position to cooperate with finger 35 of the lever and arrest it in the proper positions, and they are then driven into openings in the housing. Pins 56 and 57 are each provided with a groove and, as they fit the openings rather tightly, when they are driven in place, the metal of the housing extrudes slightly into the grooves of the pins, thereby permanently locking them against rotation.

It is accordingly apparent that pins 56 and 57 accurately stop the lever in both of its shifted positions and prevent the clutch collar from being frictionally gripped between blocks 46 and either gear 26 or gear 27.

When the parts are in the positions illustrated in Figures 8 and 11, spring 67 maintains lever 54 in low speed position, with finger 55 of arm 54 abutting stop 57, thereby relieving the clutch collar of pressure. By adjusting clevis 65, the proper operating relationship between rod 64 and lever 54 may be correctly established.

As shown in Figure 8, a pneumatic device 59, illustrated in section in Figure 11, is operatively connected to lever 54 by a pivoted link 64 and is connected to an air pressure or vacuum line 68 which extends to a manually operable valve 75 shown in Figure 7 and illustrated in section in Figure 10. In the arrangement illustrated the line 68 is a vacuum line and a second vacuum line 74 extends from valve 75 through a check valve 73 to intake manifold 71 of engine 70. If desired a vacuum tank may be connected with line 74 to smooth out variations in engine intake manifold vacuum.

As shown in Figure 11, pneumatic device 59 has a diaphragm 62 to the center of which link 64 is connected. A coiled compression spring 67 acts to move the diaphragm and link 64 in one direction and the diaphragm and link are moved in the opposite direction by atmospheric pressure acting on the diaphragm when the chamber within casing 59 back of the diaphragm is subjected to less than atmospheric pressure through vacuum line 68. The spring 67 has characteristics such that the first part of the movement of the diaphragm from either end of the casing is accomplished with a much greater force than the last part of such movement for a purpose which will be explained in detail hereinafter in connection with the description of the novel clutch structure.

Movement of the diaphragm 62 is controlled by the manually actuated valve 75, which may be a plunger type valve as illustrated or may be a rotary or other type valve as may be desired.

In the valve construction particularly illustrated in Figure 10 the vacuum lines 68 and 74 are led into a valve casing 75a at spaced locations lengthwise of the well or bore 76 through respective ports 81 and 82 and a port 85 connects the bore with the atmosphere through the cover or screen 84. The open end of the bore 76 is closed by apertured screw plug 83 which also serves to secure the screw 84 in place and through which passes the slidable valve stem 79. Upon its inner end the stem 79 carries a spool shaped plunger 77 having end piston portions which closely fit the bore 76 separated by an intermediate reduced portion 78.

The plunger has two operative positions, as indicated by the full and broken lines in Figure 10. When in the full line position the vacuum line 68 is connected with the atmosphere through port 85 and spring 67 moves diaphragm 62 and link 64 to the position illustrated in Figure 11, rotating shaft 49 to shift clutch collar 34 to its low speed position in which it operatively engages gear 26.

When plunger 77 is in its broken line position, as shown in Figure 10, vacuum line 68 is connected through the reduced intermediate portion 78 with vacuum line 74 whereby, if engine 70 is operating, vacuum will be applied to the back of diaphragm 62 to move the diaphragm against the force of spring 67. This will rotate shaft 49 and shift clutch collar 34 into its high speed position in which it is in operative engagement with gear 27.

Valve stem 79 is moved by a hand knob 86 mounted on the vehicle instrument panel or dash board 87, a connection such as a Bowden wire 88 passing through its casing or armor 88a operatively connecting the knob 86 to the valve stem 79. Thus by movement of knob 86 a pre-selection of either the high speed or low speed axle gear ratio may be effected. After the knob has been moved to the position corresponding to the desired gear ratio, release of the engine throttle control or accelerator pedal to reduce the engine power to an extent sufficient to cause a torque reversal between the engine and the vehicle drive wheels will cause an automatic shift to the desired gear ratio.

The novel clutch construction which permits this shift to take place without noise or jar and without imposing any excess strain on the drive mechanism will now be described in detail.

Referring more particularly to Figure 3, enlargement 25 of shaft 22 is provided with two rows of teeth 31 and 32, preferably of the same chordal thickness. Teeth 31 are comparatively long, while teeth 32 are short, so as to provide an annular space or groove 33 between the two rows of teeth.

Clutch collar 34 is mounted for axial sliding movement on the top lands of teeth 31 and 32 and is provided with external groove 35 and internal teeth 36 and 37.

As shown in Figures 3 and 4, teeth 36 are of comparatively short axial length, while teeth 37 are longer and also somewhat thinner. Teeth 37 are symmetrically aligned with teeth 36, so that the sides of teeth 36 project slightly either side of the corresponding sides of teeth 37, as seen in somewhat exaggerated form in diagrammatic views 4A, 5A and 6A. Teeth 36 and 37 are thick and thin respectively so as to interlock with the shaft teeth and maintain the collar in the high or low ratio, as will hereinafter appear.

Low ratio gear 26 is provided with a series of comparatively short clutch teeth 38, spaced from the helical teeth to provide a clearance groove 39, for manufacturing purposes. Teeth 38 are preferably so spaced as to provide a meshing fit with teeth 36, with a comparaticely small backlash, but if desired the backlash may be increased within limits, provided that a proper reduction is made in the shifting force to avoid premature engagement, as will be hereinafter pointed out.

High ratio gear 27 is provided with a series of clutch teeth 41, which are spaced from the helical teeth to provide an annular groove 42. Teeth 41 (Figure 6) are somewhat thicker than teeth 38 of gear 26, so as to avoid excessive backlash when meshed with narrow teeth 37 of the collar. If desired, the backlash may be varied within limits, as will hereafter appear.

The clutch collar is accordingly mounted for axial sliding movement on the countershaft selective engagement with the clutch teeth of the low speed gear or the high speed gear, and by providing collar teeth 36 and 37 and clutch teeth 38 and 41 with end faces as indicated at 36a, 37a, 38a, and 41a, respectively, lying in surfaces of revolution which are normal to the side or working faces of the clutch teeth and by properly selecting the area of said end faces and the length of the teeth with relation to the backlash or clearances between the teeth and the disengaging and engaging forces applied to the clutch collar, I have discovered that the shift between ratios may be made by merely relieving the driving pressures or upon normal torque interruptions without disconnecting the prime mover from the mechanism, silently and without clash or shock to any of the parts of the mechanism. During the shift operation, after disengagement from one ratio the flat tooth ends slide relatively in frictional engagement without burring or rattling until substantially complete synchronization of the speed of the collar and the engaged pinion is attained before meshing engagement can occur as hereinafter described in detail.

In order to insure this smooth sliding action of the contacting tooth ends before driving engagement of the gear clutch teeth with the corresponding clutch collar teeth, the tooth ends of the collar and of the clutch teeth of both gears 26 and 27 are accurately ground so that the end surfaces of each row or ring of clutch teeth lie as exactly as machine tolerances will permit in a surface of revolution generated about the axis of revolution of the corresponding clutch collar or gear, and the edge between the end surface and the side and top surfaces of each tooth is square and sharp without any chamfer or burr.

With tooth end faces so formed and smooth surfaced and with the cross sectional areas of the teeth of one set substantially equal to the cross sectional area between the teeth of the adjoining set with only a minute, carefully controlled clearance or backlash present, and with parts of proper inertia urged toward tooth engagement by correctly limited pressure, there is no tendency for the teeth of one set to drop into the spaces between the teeth of an adjoining set until a condition of substantial synchronization between two adjoining sets of clutch teeth is reached.

The invention may be carried out by employing clutch teeth whose end faces are either normal to the axis of rotation or are inclined to provide a nesting or mating frusto-conical shape, so that when they are disposed in end-to-end rubbing engagement during the synchronizing dwell, they will be maintained out of mesh, without manifesting any appreciable tendency to intermesh until the parts have been completely synchronized. Inclined tooth end forms are advantageous in gear mechanisms in which a centering action is desirable, as the frusto-conical ends set up a definite centering action, insuring proper concentric rotation during the synchronizing dwell. Tooth shapes of other forms may also be used, so long as the surfaces of the confronting tooth ends are generated by parallel lines (either straight or curved) rotated about spaced points on the axis of the clutch members.

In Figures 3 and 4 and 4A, the parts are shown in low gear, with teeth 36 of the clutch collar engaged with teeth 38 of low speed gear 26. The torquing forces are indicated by the arrows, the downward force exerted by teeth 31 of the countershaft taking up the clearances and driving the collar. The torque is transmitted through collar teeth 36 to teeth 38 of the low speed gear, as indicated in Figure 4. Since the clearances between teeth 31 and 37 are taken up, and teeth 37 are narrower than teeth 36, in normal driving relationship, the latter may be said to be hooked over the ends of teeth 31, so that, should the collar tend to shift to the right (Figures 3 and 4), the corners of teeth 36 will abut the corners of teeth 31 and block such movement so long as power is being transmitted.

When a reversal of power occurs, for example by momentarily releasing the accelerator and causing the vehicle to drive the engine, with the parts in the low ratio as seen in Figure 4, the clearances on the opposite sides of teeth 31 are taken up, and unless the clutch collar is forced to the right by a predetermined shifting pressure at this time, the opposite corners of teeth 36 will engage the opposite corners of teeth 31 and the teeth will again be interlocked. Movement of the clutch to the left is limited through engagement with the end of drive pinion 26.

From the foregoing it is apparent that, when the axle is shifted into the low ratio, the clutch collar cannot be shifted out of engagement with the clutch teeth on the gear so long as power is being transmitted in either direction between the countershaft and gear.

When it is desired to shift the collar out of low gear it is urged to the right with a predetermined pressure sufficient to effect disengagement when the application of power to shaft 22 is momentarily interrupted, as for example by releasing the accelerator. As soon as the tooth pressure is relieved or decreases sufficiently under such conditions, collar 34 slides to the right a slight distance and brings the corners of teeth 36 past the corresponding corners of countershaft teeth 31. In the event that power of only small magnitude is being transmitted when the shifting force is applied to the collar, the latter will promply bring the corners of its teeth into engagement with the corners of teeth 31.

Engagement of teeth 36 with teeth 31 under the conditions just described will momentarily arrest the collar, but if thereafter the transmitted torque drops to a value sufficiently low teeth 36 will be pulled past the corners of teeth 31. By constantly urging the collar to the right during the disengaging action under the proper pressure, which is selected with relation to the tooth lengths, areas, backlash, oil viscosities and other practical factors, disengagement occurs before a complete torque reversal can hook teeth 36 over the opposite corners of teeth 31.

In Figures 6 and 6A the parts are illustrated in the position they assume in high gear, with collar teeth 37 meshed with clutch teeth 41 and gear 27. In this condition of the parts, collar teeth 36 are located in the space 33 between the rows of teeth on the countershaft, and do not transmit power, while teeth 32 transmit power to the collar through teeth 37, and the collar transmits power to clutch teeth 41 of the high speed gear, in the manner indicated by the arrows in Figure 6. Teeth 37 being narrower than teeth 36, the clearance is taken up by the driving forces and locates teeth 36 with their corners opposite the corners of teeth 31. Accordingly, when the collar manifests a tendency to shift to the left, it is blocked by the corners of teeth 31, in either direction of power transmission.

In high gear, the clutch collar abuts the end of gear 27, which limits its movement to the right. The inner edges of gears 28 and 29 terminate slightly short of the sides of spur gears 26 and 27, so as to avoid contact with clutch collar 34.

The shift out of high gear is effected in a manner similar to that just described with respect to low gear, by applying a disengaging force of predetermined magnitude to the collar and urging it to the left until release of the accelerator reduces the tooth pressure to a value sufficiently low to permit the shift to take place.

In Figures 5 and 5A the clutch collar is illustrated in the position it assumes when it has been shifted out of low gear and is undergoing a synchronizing dwell prior to shifting into the high ratio. Since the flat ends 37a of teeth 37 are disposed in frictional rubbing engagement with the flat ends 41a of teeth 41 and teeth 37 and 41 are not meshed, when the engaging pressure on the collar is properly proportioned to the area of the flat ends, the parts slide smoothly without burring or rattling. As will be hereinafter pointed out, the deceleration or acceleration of the engine is primarily relied upon to secure synchronization when shifting into the high ratio or the low ratio respectively.

In Figure 4A direction of the driving torque is designated by the arrow 31', and the torque so transmitted to teeth 37 and through collar 34 to teeth 36 applies torque to teeth 38 in the direction indicated by the arrow 36', the backlash between the teeth being exaggerated and designated by reference character 38'. In the low gear position illustrated in Figure 4A, teeth 36 are in effect hooked over teeth 31, and because of the difference in chordal thickness of teeth 36 and 37 a relatively large degree of backlash 37' is present between teeth 31 and 37. The corner designated 36b of tooth 36 engages corner 31a of teeth 31, so that the latter constitutes an abutment which effectively restrains the parts against shifting out of low gear so long as any appreciable driving torque is being transmitted. When a coasting torque is being transmitted, tooth 36 will interlock with the lower of the two teeth 31 illustrated in a manner similar to that just described.

In Figure 5A the parts are in the dwell or neutral position, with thick teeth 36 meshed with teeth 31 of the countershaft, and thin teeth 37 are disposed in sliding engagement with end faces 41a of high gear clutch teeth 41.

In Figure 6A the parts are shown in high gear, with the driving torque being transmitted from teeth 32 to teeth 37 in the direction indicated by the arrow 32', and from teeth 37 to teeth 41 in the direction indicated by the arrow 37', the backlash present between the teeth being designated 41'. In this instance the collar is locked against shifting out of high gear by reason of the corner 36c of tooth 36 abutting or locking behind corner 31b of tooth 31.

The novel clutch and gear assembly just discussed is accordingly automatically locked when shifted into either gear ratio and transmitting power, and yet may be readily shifted from one ratio to the other without burring, rattling or clashing of the teeth by momentarily interrupting the application of power to the driving shaft when disengaging and engaging pressures of properly selected magnitude are applied as above set forth.

It will be understood that because of the variable interdependent factors which enter into practical workable designs of my invention which are generally dependent on the sizes and capacities of the parts, mechanical ease of shifting of the particular mechanical parts employed, lubricant viscosities and other factors, designers utilizing my invention will have a substantial range of practical choice, as will be hereinafter pointed out in detail.

The mechanism also embodies means for preventing any minor shifting of the clutch collar into contact with the shifting yoke, for instance when reversals of torque occur during normal operation, thereby avoiding wear of the parts. To this end, three bores 43, preferably located 120 degrees apart, are provided in countershaft enlargement 22. Located in each bore 43 is a compression spring 44 acting upon a ball detent 45. Three of the full length collar teeth 37 are cut away to provide bevelled faces 37b, and three corresponding collar teeth 36 are cut away to provide bevelled faces 36b, for cooperation with detents 45. Faces 36b and 37b are preferably disposed at an angle of approximately 30 degrees with the countershaft, so that the ball detents exert a strong holding action upon the collar in either of its shifted positions. Accordingly, no minor shifting movement of the clutch collar can occur, and it is likewise further restrained against unintentional shifting movement when power reversals occur. Since bevelled teeth 36b and 37b are only three in number and their ends lie in the same plane as teeth 36 and 37, they do not interfere with the proper sliding action and blocking of the ends of teeth 36a and 37a against teeth ends 38a and 41a in speed changing operations.

Operation

With the engine driving the vehicle, and with the axle in the low speed driving ratio, as shown in Figures 3, 4, 7 and 8. The axle may be shifted into the higher ratio by merely pulling out knob 86, so as to place casing 59 into communication with the intake manifold, and manipulating the engine accelerator, it being unnecessary to disengage the clutch.

With knob 86 pulled out, the manifold suction causes an operating pressure on diaphragm 62 tending to move toward the high speed driving position with a predetermined relatively high disengaging pressure against the action of spring 67. However, so long as power is being transmitted through the gearing, no movement of shift collar 34 occurs because tooth pressures set up a frictional force and the teeth are interlocked resisting the pull of the diaphragm. Accordingly, the mechanism is preselected for high gear operation, but the actual shift is held in abeyance until delivery of power is interrupted or a torque reversal occurs in the axle.

With high speed preselected as just described, the shift is carried out by momentarily releasing the vehicle accelerator or otherwise interrupting the delivery of power to the axle. This reduces the tooth pressure and releases the interlock permitting clutch collar 34 to be shifted at the time of release from the position shown in Figure 3, into the position shown in Figure 5, as no restrictions are present in the vacuum line. In this position the compression of spring 67 has built up, thereby reducing the force exerted by the diaphragm holding the end faces 27a and 41a of the clutch teeth in yielding frictional engagement.

With the parts shifted as just described, with the end faces 37a of the collar teeth rubbing against tooth faces 41a, the structure 13 and ring gears 28 and 29 are rotated at substantially constant speed, through the momentum of the vehicle. Because of the difference in gear sizes, high speed gear 27 is rotated at a lower speed than low speed gear 26, and since shaft 22 at the moment of pull out of the collar from the low speed gear is rotating synchronously therewith, shaft 22 and collar 34 in the condition shown in Figure 5, must be decelerated to synchronize them with the speed of teeth 41.

The engine and the associated parts, however, rapidly decelerate shaft 22 and collar 34 substantially to the speed of gear 27, at which time the predetermined pressure exerted by diaphragm 62 on the collar causes full meshing engagement with the clutch teeth of high speed gear 27, as seen in Figure 6, silently and without shock.

Accordingly, the axle is shifted quickly, silently and without burring, clash or jerk from the low speed to the high speed ratio without need of disengaging the vehicle clutch. The entire shift operation requires but a few seconds to complete in practice, and is effected in substantially the same way whether the vehicle is on the level, or travelling up or down grade at the time of the shift operation. When the vehicle is travelling down grade the shift period may be shortened slightly due to acceleration of the vehicle while coasting during the shift operation, but since meshing occurs automatically upon synchronization, slight variations in the time of shift are immaterial. Upon conclusion of the shift the accelerator is depressed to cause the engine to drive through the high speed ratio.

The driver may ascertain when the shift has been completed by observing the tendency of the vehicle to drive the engine, or by observing the speedometer. If he should happen to accelerate the engine before the shift is completed, it is impossible to damage the mechanism because the ends of the clutch collar teeth 37 will merely slide smoothly on faces 41a of the high speed clutch teeth until the engine is again decelerated until synchronization of the clutch teeth occurs.

The shift from high gear into low gear is made in a manner similar to the shift into high gear, except that after pre-selection the shift is not completed until after the engine has been decelerated and then accelerated. To effect this shift, with the vehicle operating in a high speed ratio, knob 86 is pushed in to open chamber 59 to the atmosphere. This frees spring 67 to urge arm 54 toward the low speed position with its maximum force. However, so long as power is transmitted through the axle, the frictional tooth pressures and interlock of the teeth prevents the clutch collar from shifting, with the result that the axle is maintained in the high speed driving ratio after pre-selection by so operating the knob. With low speed pre-selected as just described, the accelerator is momentarily released or the power otherwise interrupted, and when the tooth pressure falls off and the interlock is released sufficiently, spring 67 forces the clutch collar to the left quickly disengaging teeth 37 from teeth 41 and quickly bringing the end faces 36a of teeth 36 into rubbing engagement with end faces 38a of teeth 38 with a lowered pressure due to partial extension of the spring.

Under the conditions just described, gear 26 is rotated through momentum of the vehicle at a greater speed than gear 27 and shaft 22, and accordingly the engine must be accelerated, rather than decelerated, to bring the clutch collar into synchronism with teeth 38. During acceleration of the engine, the collar teeth smoothly and silently ride upon teeth 38, and permit intermeshing only when the speeds are substantially synchronized. Upon substantial synchronization of the collar and gear 26, spring 67 promptly shifts the clutch collar into the position shown in Figure 4, meshing teeth 36 with teeth 38 and completing the shift into low gear.

I have found that when shifting from the high to the low ratio, the rotational inertia of the engine flywheel, propeller shaft and associated parts is a real advantage, because it prevents the engine from being accelerated too rapidly and possibly passing the point of synchronism too quickly to permit meshing of the teeth. In practice, with properly proportioned parts, it has been impossible to accelerate the engine with sufficient rapidity to produce a clash or shock in shifting from the high to the low ratio.

The axle may also be readily shifted when the vehicle is at a standstill and the engine is running, by pulling out or pushing in knob 86. Should the clutch teeth not be aligned with the teeth of the selected gear when pre-selection is made, the parts will immediately go into the mesh when the vehicle clutch is engaged, so as to rotate shaft 22. This operation also occurs without shock because shaft 22 can only rotate a distance less than the chordal thickness of one of the clutch teeth before engagement occurs, thereby preventing relative rotative speeds of any appreciable magnitude from developing before meshing can occur.

Proportions and essential specific structure

As hereinbefore pointed out generally, it is essential to the proper functioning of my improved shift mechanism, that a proper relationship be established between the shape and area of ends of the intermeshing teeth, the backlash and the length of the teeth with respect to the engaging and disengaging pressures. The tooth interlock disclosed while permitting desirable selection of the desired ratio well in advance of the actual shift, or so-called pre-selection, is not essential to the operation.

An important requirement is that each cooperating set of engaging end faces of the collar teeth and the cooperating clutch teeth be smooth and lie in parallel surfaces of revolution generated by a pair of lines rotated about spaced points on the axis of rotation of the clutch collar, and that their corners be sharp and free from rounded or chamfered edges. The areas of the engaging end faces of the teeth and the backlash must be so chosen with relation to the engaging pressures that the time interval required for the tooth of one member to pass over the space between two teeth of the other member is too small to give the tooth an opportunity to drop into space until the teeth are substantially synchronized and so that the parts will be brought into substantial synchronism in a comparatively short interval of time without burring or clashing. Since these factors may be varied to meet individual design preferences, it will be apparent to those skilled in the art that various operative practical combinations thereof are available. I have also found that best results are secured when the widths of the engaging teeth are approximately the same to provide maximum engaging area of the ends of the teeth. When narrow teeth are meshed with wide teeth, the unit pressure is increased during synchronization, and there is a tendency toward premature meshing.

The power applied to secure engagement and meshing of the clutch teeth should be yieldingly applied and should be sufficient to assure complete mesh when substantial synchronism of the clutch teeth is obtained, but should not be so great as to cause burring clash or premature engagement of the clutch teeth. It is also necessary to apply sufficient disengaging power to assure quick disengagement of the clutch teeth when the driving pressures are released after preselection of a new driving ratio. The proper engaging and disengaging pressures will be dependent not only on the tooth areas, shapes, lengths and backlash, but will be affected by resistance to relative sliding of the parts caused by oil viscosities, mechanical fits and the like. While the limits of proper operating pressures in practical transmission assemblies are not narrow for any given construction these limits are definite and predetermined by the factors above set forth. And within limits, the greater the backlash between the meshed teeth, the lower the engaging pressures must be, to avoid meshing before synchronism with resultant shock and jerk.

The use of interlocking teeth, as above pointed out, is desirable because it permits effective preselection of a changed speed ratio well in advance of the actual shift, because even though disengaging pressures are applied as soon as the preselection is made, so long as driving power is applied, disengagement of the clutch teeth will not occur due to the interlock. To assure disengagement on relief of the driving pressure, when the interlock is used, relatively higher disengaging pressures should be applied than when the inter-lock or an equivalent device is not used. When the interlock or the like is not used unless an arrangement, as for example a clutch pedal operated valve control of the well known Columbia axle type, is used to apply the shifting pressures at the time the shift is desired, the disengaging pressure must be lowered sufficiently to avoid forcing the teeth out of mesh before the driving pressures on the teeth are released.

By way of a specific practical application of my invention the axle and controls therefor so far described were designed for and have been and are being used successfully in trucks having engines of from 318 to 362 cubic inch displacement with a maximum torque output of from 250 to 285 ft. pounds at 1400 R. P. M., and having a rated rear tire load capacity of from 13,000 to 17,500 pounds.

The overall gear ratio between drive shaft 17 and the axle shafts in high gear is 6.53 to 1 and in low gear is 8.53 to 1.

Bevel pinion 19 has an outside diameter of 4¼" and is provided with nine teeth.

Low speed helical pinion 26 has a maximum outside diameter of 4.863 inches and has fourteen teeth, 3⅞ inches long. It is journalled on a portion of shaft 22 approximately 2.62 inches in diameter. Clutch teeth 38 are thirty-two in number, are $\frac{3}{32}$ inch long and have an outside diameter of 4.103 inches. Teeth 38 also have a pitch diameter of 4 inches, a chordal thickness of 0.195 inch and a chordal spacing of 0.197 inch.

Helical high speed pinion 27 has a maximum outside diameter of 5.776 inches and has seventeen teeth, three inches long. It is journalled on a portion of shaft 22 approximately 2.96 inches in diameter. Clutch teeth 41 are the same as teeth 38, except that they have a chordal thickness of .207 inch and a chordal spacing of 0.185 inch. Both sets of clutch teeth have a pitch of 8, a pressure angle of 25 degrees and a full depth of .198 inch.

Clutch collar 34 has an outside diameter of 5½ inches, a width of 1⅜ inches, and a minimum internal diameter of 3.79 inches. Teeth 36 and 37 are thirty-two in number and have a pitch diameter of 4 inches and a depth of 4.125 inches. Teeth 36 are $\frac{1}{2}$ inch long and have a chordal thickness of .195 inch and are chordally spaced .197 inch so that they may mesh with teeth 38 with a backlash of approximately .002 inch. Teeth 37 are spaced $\frac{3}{32}$ inch from teeth 36, are $\frac{39}{64}$ inch long and have a chordal thickness of from .155 to .165 inch so that they may mesh with teeth 41 with a backlash of from .020 to .030 inch. The sides of teeth 36 project from 15 to 20 thousandths of an inch either side of the corresponding sides of teeth 37.

The weight of the collar has a bearing upon the shifting characteristics of the mechanism because, as the teeth of the collar slide against the high or low speed clutch teeth, whether or not the collar will respond to a tendency to mesh with the clutch teeth prior to synchronization will depend to some extent upon the inertia of the collar. By increasing the weight of the collar, the tendency of it to shift axially during the small time intervals during which the teeth are aligned during the synchronizing operation may be reduced. I have found that a collar weighing 22 ounces proves very satisfactory when using parts dimensioned as disclosed, but it is to be understood that by decreasing the backlash and/or the engaging pressure the collar weight may be reduced.

The shaft teeth have a maximum outside diameter of 4.147 inches and a chordal thickness of .195 inch, a pitch of eight, a full depth of .198 inch and the two rows are spaced 1¼ inch apart. The teeth are chordally spaced 0.197 inch, so as to mesh with collar teeth 36 with a backlash of .002 inch and with teeth 37 with a backlash of from .022 to .032 inch. Teeth 31 are 7/8 inch long and teeth 32 are 3/2 inch long.

Shift arm 54 is approximately two inches long, and the effective area of diaphragm 62 is such that with the vacuum applied, and high gear selected, a pull of from approximately 125 to 175 pounds is exerted on clutch collar 34, tending to pull it out of mesh with the low speed teeth. After the parts have been shifted out of the low ratio, by interrupting the delivery of torque in the manner previously described, and while the parts are being synchronized, with end faces 37a and 41a in contact, the vacuum exerts a pressure of from 30 to 40 pounds on rod 64, the drop in magnitude being brought about by the build-up of opposing pressure in spring 67. When the collar is being shifted in the opposite direction, out of high gear, spring 67 exerts a pull-out force of approximately 125 to 175 pounds upon the clutch collar. After the clutch has been shifted out of high gear, and during the synchronizing dwell, with tooth end faces 36a and 38a in sliding engagement, spring 67 exerts a force of from 30 to 40 pounds upon the clutch collar, tending to shift it into the low ratio. In short, the spring strength and vacuum diaphragm or piston areas are preferably so selected that the disengaging or "pullout" force bears a ratio of from 2 to 1, to 4 to 1 with respect to the engaging or "pull-in" force for best results with the other parts proportioned as disclosed.

Teeth 36 and 38 are of sufficiently great chordal thickness to establish a backlash of approximately .002 of an inch, while the backlash between teeth 37 and 41 is from .020 to .030 of an inch. The backlash on the low side may, however, be increased by decreasing the engaging pressure, and on the high side it may be decreased by increasing the engaging pressures.

It will therefore be understood that my invention is not limited to use of any particular degrees of backlash or to any of the other proportions and arrangements disclosed by way of specific example, as various ranges, proportions and arrangements of parts may be employed in combination with shifting forces of the proper magnitudes to secure the benefits of my invention.

Modified control mechanisms

While I have shown diaphragm 62 actuated toward the low speed side with a spring, and toward the high speed side in response to engine intake vacuum, thereby providing a simple arrangement giving relatively high disengaging forces compared to the engaging and meshing forces, these results can be accomplished by utilizing any suitable source of shifting power, as for example suitably controlled vacuum or air pressures with or without modifying springs on both sides of a diaphragm, or a spring operated actuating mechanism of the type shown in United States Patent to Maybach No. 1,719,188, or any other methods of yieldingly applying appropriately predetermined engaging and disengaging pressures to the shiftable clutch member.

In Figure 12 I have disclosed a double acting vacuum assembly in which shift arm 54 is pivotally connected to a rod 91 carrying a piston assembly 92 working in a cylinder 93, which is closed at both ends. Compression spring 94 acts upon the piston assembly so as to urge the parts toward the low speed driving range, but it is to be understood, if it is not desired to take advantage of an automatic shift into the low ratio when the vacuum fails, spring 94 may be omitted.

The opposite ends of cylinder 93 are placed in communication, by means of a pair of conduits 95 and 96, with a control valve 97 of modified construction. Valve rod 98 is controlled by wire 88 in the same manner as valve rod 79, but carries valve member 99 which is hollow and has a wide annular groove 101 constantly in communication with a port 102 leading to conduit 74 connected to the intake manifold.

Groove 101 may be selectively aligned with a port 103 communicating with conduit 95 or with a port 105 communicating with conduit 96. In the position shown in Figure 12, the intake manifold is in communication with the upper end of the cylinder through port 102, groove 101, and port 103. The lower end of the cylinder is in communication with the atmosphere through conduit 96, port 105 and a plurality of exhaust ports 106 provided in the valve casing.

When valve member 99 is shifted into its right-hand position, groove 101 places the lower part of the cylinder in communication with the intake manifold through port 105, groove 101 and port 102. Under these conditions the upper part of the cylinder is placed in communication with the atmosphere through conduit 95, port 103, the hollow interior 107 of the valve, ports 108 in the end of the valve, and ports 106 in the valve casing.

Accordingly, by shifting knob 86 in or out, so as to place either the upper or the lower end of the cylinder in communication with the intake manifold, the axle may be shifted into the low or the high ratio respectively, in the manner as previously described.

Speedometer controls

When the drive axle gear ratio is changed it is obvious that the gear ratio of the speedometer drive must be changed accordingly if correct speedometer readings are to be maintained.

While the prior speedometer shift mechanisms in common use may be used with my improved axle, in such prior mechanisms the speedometer shift occurs at the time of selection of a ratio, and thereafter, until the actual shift is effected, the speedometer reading is erroneous.

In Figures 7, 8 and 9 I have illustrated a novel speedometer drive control mechanism which will automatically shift a speedometer change speed gearing only at the time of the axle shift to establish the proper driving relationship between the drive shaft and the speedometer in both the high and low shifted positions of the axle.

In Figure 7 a conventional clutch housing 111, and a selective shift transmission 112, having a gear shift lever 113, are shown connected to engine 70 in well-known manner, and the output shaft of the transmission drives a propeller shaft 114 through a universal joint assembly 115. Shaft 114 is coupled to shaft 17 in well known manner. Driven from the transmission tail shaft in well known manner is a speedometer drive shaft 116 (Figure 9). Shaft 116 is connected to a speedometer change speed transmission 117 of any suitable character embodying selectively shiftable two speed gearing having speed ratios corresponding to the speed ratios of the gears in the axle, so that when the axle and speedometer drive gear are operating in the low ratio or when the axle and the speedometer drive gear are in the high ratio, the speedometer will correctly indicate the vehicle speeds.

The change speed gear is controlled by a shaft 118 carrying a shift arm 119. With the arm in the position shown in Figures 7 and 9 the speedometer drive gear is in the low ratio. A flexible drive shaft assembly 121 leads from the output side of the change speed gear 117 to a speedometer 122 mounted on the vehicle dash, in well known manner.

Shift arm 119 is controlled substantially directly in accordance with the movements of axle shaft lever 54 to change the speedometer gear ratio only when the axle is shifted into the selected ratio. A lever 124 mounted on shaft 49 is connected to a Bowden wire control assembly, comprising an actuating wire 125, and a sheath 126. The forward end of sheath 126 is connected to a bracket 127 carried by casing 117, and wire 125 passes through an opening in the end of lever 119 and is provided with a pair of spaced abutments 128 and 129. Interposed between the abutments and arm 119 are a pair of compression springs 131 and 132, preferably of equal free length and strength. In the position shown in Figure 9, spring 131 is compressed between abutment 128 and the arm, holding the latter in the low speed driving position.

In operation, when clutch collar 34 is pulled into the synchronizing position shown in Figure 5, lever 124 is simultaneously shifted into a position intermediate the high and low speed positions, and through wire 125 moves speedometer shift lever 119 into an intermediate position and interrupts the drive to the speedometer. When the collar moves into full meshing engagement with the clutch teeth of high speed gear 27 as shown in Figure 6, arm 124 through wire 125 simultaneously shifts speedometer gear shift lever 119 into the high speed driving ratio. If, however, at the moment of shift the speedometer drive change gears have their teeth disposed in end-to-end abutting relationship, spring 132 will yield and subsequently bring the parts into proper driving engagement, thereby avoiding blocking the shift of axle shift lever 54.

The speedometer driving gear mechanism will then remain connected in the high speed ratio, until the axle is shifted out of the high speed ratio, at which time arm 124 will actuate wire 125 to first disconnect the speedometer drive, and then, as the axle is shifted into the low speed ratio, the speedometer driving gearing will be shifted into the corresponding speedometer low speed driving ratio.

It will accordingly be seen that the speedometer will be disconnected while clutch collar 34 is dwelling between high and low speed positions, and will correctly indicate the vehicle speed at all other times, including the periods of pre-selection.

In Figure 13 I have disclosed a modified form of speedometer control embodying vacuum responsive operating means to replace the mechanical connection to the axle shift lever as disclosed in Figures 6 to 9.

In this form of the invention a T connection 135 is inserted in vacuum line 68, and connected thereto, by a conduit 136, is a vacuum chamber assembly 137 having a diaphragm 138. Connected to diaphragm 138, by means of a rod 139 and a clevis 141, is a modified control lever 142 secured to shaft 118 of speedometer speed change control mechanism 117. A compression spring 143 constantly urges the diaphragm and rod 139 toward the low speed speedometer drive position.

In the operation of this arrangement when knob 86 is pulled out to place conduit 68 in communication with the intake manifold, diaphragm 138 is moved to the right against the action of the spring 143 and shifts the speedometer into the high speed driving ratio. When knob 86 is pushed in, or if the vacuum should fail, diaphragm 138 will move to the left under the influence of spring 143 shifting the speedometer gearing into the low speed ratio.

Since, in the preferred embodiments of my invention, shift into either speed ratio occurs only after release of the driving pressures, during the period of pre-selection, this form of speedometer control will cause an erroneous speedometer reading until the actual shift is effected.

In Figures 14-20, I have shown a modification of my invention having radial as well as axial teeth formed according to the invention embodied in a planetary two speed axle of substantially the same design as the subject matter to which A. A. Wiedmaier Patent No. 1,815,689, granted July 21, 1931, is directed.

Shown, particularly in Figure 14, is an axle housing comprising a center section, generally indicated at 150, having an annularly shaped portion 152 and an annularly shaped portion 154, preferably provided with an integral bearing support member 156, said two annularly shaped portions being secured together in any conventional manner as by cap screws 158.

Forwardly the center section 150 is provided with a circular opening 160 in which is supported pinion bearing cage 162 seating twin roller bearings 164 in which pinion shaft 166 is rotatably mounted.

Secured to and extending axially from annular portion 152 is tubular member 170. Oppositely extending tubular portion 172 is secured to and extends from annular portion 154. Bearing support member 156 of annular portion 154 and tubular end portion 170 are provided with roller bearings 175 and 177 in which is rotatably supported the transmission mechanism to be described.

The pinion shaft 166, which is coupled at its forward end to the vehicle propeller shaft (not shown), extends rearwardly, terminating within the center portion of the axle housing in a bevel pinion 180. The bevel pinion meshes with a bevel ring gear 182 which with generally cup-shaped portions 185 and 187 constitutes a planetary gear housing, generally indicated at 188. The housing 188 is rotatably supported at one end by an axially extending tubular portion 190 integral with bevel ring gear 182 in roller bearing 177 and at its opposite end by an axially extending tubular portion 192 rotatably supported in roller bearing 175.

The cup shaped portion 187 of planet housing 188 has a wall portion 195 substantially transversely disposed with respect to its rotational axis and is provided with a corresponding transversely disposed portion 197 axially inwardly spaced from said wall portion. Wall portion 195 and the axially inwardly transversely disposed portion 197 are connected by a desired number of planet pinion pins, one of which is indicated at 198. On the planet pinion pins, which are substantially equally radially spaced and parallel to the rotational axis of the planet housing, are journalled planet pinions, as indicated at 200.

The planet pinions 200 mesh with an internally toothed ring gear 202 which is carried by a generally frustro-conical shaped member 204 secured to the spider 206 of the conventional differential D comprising spider 206, differential pinions 208 and differential side gears 210. Side gears 210 are integral with axle shafts 211 and 212.

The teeth of planet pinions 200 mesh inwardly with the teeth of sun gear 215, integral with an axially extending quill 217 through which axle shaft 212 extends and on which a toothed collar 220, which will be more fully described, is slidably splined.

For the purpose of effecting either one of the two axle ratios the axially shiftable toothed collar 220 is arranged to selectively connect the planet sun gear 215 to the planet housing 188 through the tubular member 192 and teeth 226 rigid with the planetary gear housing, or to the axle housing through the fixed brake member 235 secured in any conventional manner to the annular section 154 of the axle housing. Brake 235 is formed with internal teeth 228 adapted to mesh with teeth 224 on collar 220 as illustrated in Figure 14.

In one position of the toothed collar 220, power transmitted through the pinion shaft 166, bevel pinion 180, and bevel ring gear 182, to the planet housing 188, will rotate the planet pinions 200 bodily with the planet housing holding the planet pinions against rotation on their pins, thus locking the internal ring gear, planet pinion, planet housing, and planet sun gear as a unit, so that the power is transmitted directly to the axle shafts 211 and 212 through the differential. In the alternate selective position collar 220 connects the sun gear to the axle housing whereby the bevel gear set and planet housing will drive the planet pinions about the sun gear thus driving the planet ring gear and consequently the axle shafts at a greater speed than that of the planet housing.

Collar 220 at its inner end is provided with a plurality of inwardly directed radial teeth 222 which, upon movement to the left, may engage the axially directed teeth 226, and outwardly directed radial teeth 224 which may, upon movement to the position illustrated in Figure 14, engage the inwardly directed radial teeth 228 on the stationary brake member secured to the housing. Collar 220 is also provided with an external annular groove 240 into which radially directed trunnions 242 project to shift the collar axially on mating internal splines 245 in the collar and external splines 247 on the quill 217. The weight of collar 220 has a direct effect upon the shifting characteristics of the mechanism and the tendency of the teeth on the collar to disengage from and to intermesh with their mating teeth. Synchronism depends to some extent upon the inertia of the collar. I have found that a collar weighing approximately 35 ounces in a mechanism of the size hereinafter disclosed is satisfactory.

In this shift mechanism, as in the hereinbefore described double reduction two-speed shift mechanism, it is very important that proper relationship be established between the shapes and area of the ends of the intermeshing teeth as well as the backlash between the teeth and the length of the contact surface between the teeth when they are intermeshed.

It is essential that the cooperating end faces of the collar teeth and the teeth adapted to mesh therewith, which abut before engagement and intermeshing, be smooth and lie in parallel surfaces of revolution generated by a pair of lines rotated about points on the axis of rotation of the collar, and that all of the faces have sharp corners free from rounded or chamfered edges. The area of the end faces of the teeth and the backlash must be correlated to the pressures tending to engage the teeth after abutment in order that the teeth will properly engage and mesh upon substantial synchronism but will not tend to intermesh before that time thus burring or chipping the sharp edges. These factors may be varied to meet various conditions and circumstances.

The pressure to engage and mesh the teeth should be yieldingly and lightly but positively applied and sufficient to complete the intermeshing upon the substantial synchronism between the mating teeth. It has been found that the disengaging power should be of sufficient magnitude, which is substantially greater than that of the engaging power, to assure swift disengagement after preselection and torque interruption to avoid the possibility of the collar teeth being caught upon torque reversal thus interrupting the shift sequence.

In the practical application of my invention to a planetary two-speed overdrive axle for a medium size passenger car, I have found the following relationships to provide a very satisfactory mechanism.

The overall gear ratio in this unit between pinion shaft 166 and axle shafts 211 and 212 is 4.11 to 1 in direct ratio and 3.65 to 1 in overdrive ratio.

The 8 equally spaced axially directed housing teeth 226 have the following approximate dimensions: outside diameter of 2"; length of ¼". The 8 inwardly directed, mating radial teeth 222 have a root diameter of 2"; an inside diameter of 1.6"; a length of ¼".

The 12 equally spaced inwardly directed, stationary radial teeth 228 have the following approximate dimensions: Root diameter of 3¼"; inside diameter of 3". The 12 outwardly directed, mating radial teeth 224 have an outside diameter of 3¼"; an inside diameter of 3"; a length of ¼".

The relationship of the chordal width of the mating teeth is as near equal as practicable, being varied only to the extent necessary to maintain a backlash of approximately .015" to .025" therebetween.

Collar 220 may be shifted by any suitable means. Shown in Figure 14 is lever 250 journalled for rocking movement on fixed member 252 which is securely attached to the annular portion 154 in any conventional manner. The upper arm of lever 250 is provided at its end with a substantially spherical portion 254 for optional contact with the sides 256 and 258 of the lateral slot 260 in piston rod 275. The lower lever arm is bifurcated providing a yoke 253 into which are secured a pair of trunnions 242 disposed in groove 240 of the collar.

In order that the sun gear 215 may have sufficient freedom of self centering movement relative to the planet gears to equalize the tooth pressures between the sun gear and the various planet gears, it is desirable that the quill 217 have a limited amount of radial floating movement relative to the axle shaft 212. However, as too great a freedom of floating movement would interfere with the centering of the collar teeth 222 and 224 relative to their mating teeth 226 and 228, means are provided to limit the radial floating movement of the quill. This means may conveniently comprise a bushing 230 disposed between the quill and the axle shaft to prevent forces, such as the weight of the collar, acting on the quill, from causing misalignment of the clutch teeth. A bushing having an internal diameter approximately 0.005" greater than the external diameter of the axle shaft and an external diameter approximately the same as the internal diameter of the quill has been found satisfactory for this purpose.

In Figure 14 I have shown a vacuum motor, generally indicated as 270, comprising a cylinder 271, conduit nipples 272 and 273, piston 277, and piston rod 275, secured to the tubular portion 172 in any conventional manner. Conduits 272 and 273 are provided to optionally apply intake vacuum of the vehicle engine to the desired side of the piston 277 in order that the piston may exert thrust on the piston rod 275 to which it is attached, in the desired direction.

The effective area of piston 277 is such that the vacuum normally exerts a pull of approximately 80 pounds pressure on the piston rod 275 which in turn transmits this pressure to the substantially spherical end 254 on lever 250. In view of the fact that the leverage ratio of the shift lever is approximately 3½ to 1, a pressure of approximately 250 pounds is initially exerted to disengage the teeth 222 and 226 or 224 and 228.

The piston rod 275 is provided with a lateral slot 260 forming faces 256 and 258 for engagement with the spherical end 254 of the shift lever for reciprocating the piston rod. The width of the slot 260 is approximately equal to the diameter of the spherical end 254 of the lever plus the depth of engagement of the teeth 222 and 226 and clutch teeth 224 and 228. Also provided in the piston rod are bores 280 and 282 (see Figure 19) into which are inserted coil springs 284 and 286 respectively. The outer end of the bore 280 is tapped to accommodate closure cap screw 288. The size of the coil springs is determined by the magnitude of pressure necessary to intermesh the mating teeth.

As will be more fully explained, the reciprocable piston merely disengages one set of teeth and moves the other set of mating teeth to a point short of sliding engagement; coil spring 284 or 286 functioning as the only power means effective to mesh the mating teeth.

In one direction of travel contact of the piston 277 with annular member 276 on cylinder member 271 limits the length of travel of the piston rod 275, while in the opposite direction of travel the engagement of the outer end of piston rod 275 with the end of the vacuum cylinder 271 limits the length of travel of the piston rod.

Coil springs 284 or 286 exerting a pressure of approximately 35 pounds have been found satisfactory to intermesh the mating teeth after substantial synchronism without clashing or raking of the teeth before intermeshing.

Any one of the many known types of valve construction may be employed to optionally connect vacuum cylinder conduits 281 or 282 to the engine vacuum. In Figure 12 is shown one form of valve comprising a three-way valve housing 97, having nipple 102 for communication with the engine manifold.

*Operation*

The operation of the shift mechanism will now be explained. As shown in Figure 14 the device is in overdrive or high ratio, the sun gear 215 being locked to the stationary member 235 through the external splines 247 on the quill 217 and the mating internal splines 245 in the collar 220, the external teeth 224 on the collar and the internal teeth 228 on the stationary member.

To shift to low or direct ratio the vacuum piston 277 is caused to move to the right from the position illustrated by the action of the engine vacuum through nipple 273 by control valve such as shown in Figure 10.

The initial movement of the piston rod 275 compresses coil spring 284. The compression of the spring causes the face 256 of the lateral slot 260 to contact the spherical end 254 at the end of the shift lever 250. Continued movement of the piston rod to the right moves the yoke 253 to the left. The trunnion 242 in turn moves the clutch collar 220 to the left and causes teeth 224 to disengage from teeth 228. The disengagement is extremely rapid as the piston 277 is operating at its greatest power produced by the high engine vacuum. Swift disengagement is essential as the teeth must disengage before torque reversal interferes with the shift sequence. Movement of the rod continues until the outer end of rod 275 abuts the end of the cylinder 271. The movement of the rod is of such a predetermined distance as to move the flat faced, sharp edged teeth 222 only approximately into abutting engagement with the mating, flat surfaced, sharp edged teeth 226 of the planet housing. Upon, and not until, substantial synchronism of the collar and the planet housing does the pressure exerted by the still substantially fully compressed spring 284, which has caused teeth 222 to contact teeth 226, force the teeth 222 of the collar into intermeshing engagement with the teeth 226 of the planet housing.

When the collar 220 is disengaged from the stationary teeth 228 the planet sun gear 215 becomes a free member, its rotation being controlled by the direction and speed of rotation of the planet ring gear 202 and planet housing 188.

Assuming the collar 220 to be disengaged from both its mating sets of teeth 226 and 228, the planet ring gear speed and direction is controlled by the speed and direction of the vehicle wheels (not shown) to which it is coupled by the axle shafts 211 and 212, differential D and frustro-conical shaped member 204.

The forward motion of the vehicle in normal operation rotates its wheels in a clockwise direction. This in turn rotates the planet ring gear 202 to which the wheels are coupled in a clockwise direction.

The speed of rotation of the planet housing 188 is controlled by the speed of rotation of the engine to which it is coupled by the propeller shaft (not shown), bevel pinion 180 and bevel ring gear 182.

The speed and direction of rotation of the planet pinion 200, and consequently that of the planet sun gear 215, is determined by the relative speed of rotation and direction of travel of the planet housing 188 and planet ring gear 202.

Upon deceleration of the engine for torque interruption and disengagement of the teeth the speed of the planet housing decelerates. When the speed of the planet housing becomes less than that of the ring gear, the ring gear tends to rotate the planet pinions 200 on their pins 198 in a clockwise direction. As it is necessary to synchronize the speed of the planet sun gear with that of the planet housing it is necessary to accelerate the engine, and consequently the planet housing, to reverse the direction of rotation of the sun gear. When the engine is accelerated until the speed of the planet housing equals the speed of the planet ring gear the planet pinions are not rotating on their axis and consequently the sun gear rotates at a speed equal to that of the planet housing, that is, the planet housing speed and the planet sun gear speed are synchronized, at which time the teeth 222 and 226 intermesh by the action of the still compressed springs 284 and the planet housing, pinion, sun gear and ring gear are interlocked and rotate as a unit.

Conversely, in shifting from direct or low ratio to overdrive the teeth 222 and 226 are disengaged and the engine is decelerated while the speed of the planet ring gear 202, to which the vehicle wheels are coupled, tends to remain substantially the same. With the engine decelerating, and consequently the speed of the planet housing 188 decelerating, the ring gear 202 tends to rotate the pinions 200 on their pins in a clockwise direction. This clockwise rotation of the planet pinions tends to rotate the sun gear 215 in a counter-clockwise direction. The effect of this tendency to reverse the rotation of the planet sun gear is to reduce the speed of rotation of the planet sun gear to zero, at which time the clutch teeth 224 engage with the clutch teeth 228 by the action of the compressed spring 286.

When the parts are in this position, as shown in Figure 14, and the vehicle is in forward motion, for example, the clockwise rotation of the bevel pinion 180 rotates the bevel ring gear 182 in a counter-clockwise direction. Planet pinions 200 journalled on their pins rotate with the housing as a unit in a clockwise direction about the fixed sun gear 215 driving the planet ring gear 202 at a speed greater than that of the bevel ring gear 182 in a clockwise direction. The planet ring gear drives differential D, the axle shafts 211 and 212, and the wheels with which it is coupled, in the same direction.

Figure 20:
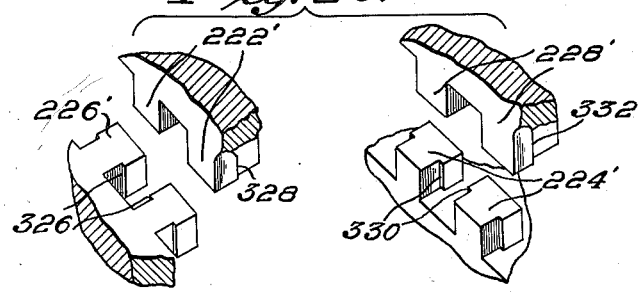
Figure 20 is a perspective view of fragmentary portions of the mechanism of Figure 14 showing a modified clutch tooth construction to provide a locking function.

In Figure 20 there is illustrated a modified tooth construction for the meshable teeth of Figure 14. In this arrangement the teeth are provided on their sides or working faces with slight offsets or shoulders which overlap to maintain intermeshed teeth against disengagement during the transmission of power in either direction.

In the arrangement illustrated the teeth 226', corresponding to the teeth 226 of Figure 14, are provided intermediate the length of each side face with a lateral shoulder as indicated at 326 making the teeth somewhat T shaped in plan. The lateral extent of each shoulder, however, is only a few thousandths of an inch. Teeth 222', corresponding to teeth 222 of Figure 14, are provided along their side or working faces with corresponding lateral shoulders, as indicated at 328. The shoulders 326 and 328 are so located along the length of the teeth that when the teeth 222' are fully meshed with teeth 226' shoulders 328 overlap or hook over shoulders 326 and prevent disengagement of the teeth while power is being transmitted in either direction the larger end portions of teeth 226' will, however, pass between the larger portions of teeth 222' so that, upon cessation or interruption of power transmission through the intermeshed teeth, teeth 222' may be drawn away from teeth 226' to discontinue the drive therethrough. The teeth of these two sets may also be readily engaged in the manner described above in connection with Figures 14 to 17, inclusive.

Teeth 224', corresponding to teeth 224 of Figure 18, and 228', corresponding to 228 of Figure 14, are also provided with lateral offsets or shoulders as indicated at 330 and 332, respectively, which cooperate in the same manner as shoulders 326 and 328 on teeth 226' and 22' to maintain teeth 224' and 228' in engagement during transmission of power therethrough. These teeth may also be engaged and disengaged under conditions of relative synchronization in the manner hereinabove described.

In either event the shift into the selected gear is carried out quickly and without clash or jerk, insuring a minimum of loss of vehicle headway during the shift.

From the foregoing disclosure of the invention it is apparent that I have provided a novel multiple speed power transmitting mechanism which is of extremely simple design, enables the shift into low or high gear ratio to be carried out in a minimum of time under any and all vehicle speed and load conditions, silently and without clash or jerk, and without disengaging the vehicle clutch, and it also embodies novel control means which make it possible to pre-select the desired gear ratio at any desired instant and to subsequently carry out the shift by manipulating the vehicle accelerator, and which also shifts into one ratio if the engine should stall.

It is also to be understood that the invention is not limited to coupling two rotating parts, but may be advantageously employed in planetary or other type transmissions for coupling any two relatively rotatable parts wherein a rotatable part is selectively coupled to a stationary member to effect a speed change, and the recitation of relatively rotatable parts in the appended claims in intended to embrace the invention when it is embodied in those forms.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a multiple power transmitting assembly, a pair of relatively axially movable speed change clutch members mounted for relative rotation about a common axis and operable to transmit torque in both directions of rotation when they are coupled together; axial clutch teeth on each of said members; flat ends on said teeth disposed in a plane normal to said common axis and joining their working faces along sharp, non-chamfered edges; and said clutch members having predetermined clearances between said teeth when intermeshed; the clutch teeth of one member being set back from the end thereof, whereby said members, when said flat tooth ends are engaged, are disposed in telescoping relationship; means for forcing said members into engagement; the shapes and areas of said teeth ends and said clearances being of such relative proportions that, when said members are forced into engagement under predetermined pressure in a normal speed changing operation, the ends of said teeth will abut and slide relatively in frictional engagement in a common plane normal to said axis and prevent any appreciable tendency to intermesh until synchronization of the teeth is substantially complete.

2. In a multiple speed power transmitting assembly, a pair of relatively axially movable speed change members mounted for relative rotation about a common axis and operable to transmit torque in both directions of rotation when they are coupled together and having axially directed clutch teeth; means for shifting said members into and out of engagement; smooth faces on adjacent ends of said teeth so shaped and of such relative areas and the meshing teeth having such degrees of backlash that when brought into engagement in a normal speed changing operation they will abut in sliding engagement in a common surface of revolution generated by a line rotated about said axis and will slide relatively without burring or clashing while tending to synchronize; and torque transmitting surfaces on said teeth joining said end faces along sharp edges, whereby any appreciable tendency for said members to undergo relative axial movement beyond said plane of sliding engagement is precluded until their speeds are substantially synchronized.

3. In a multiple speed power transmitting assembly, a pair of toothed speed change members mounted for relative rotation in spaced relationship about a common axis; an axially shiftable toothed clutch collar rotatable about said axis between said members adapted to selectively mesh with said members to transmit power at differing speed ratios, flat ends on the teeth of said members and said clutch collar disposed in parallel planes normal to said axis and joining the sides of said teeth along sharp, non-chamfered corners; said members and said collar having predetermined clearances between their teeth when intermeshed; and means to urge said clutch collar into engagement with the flat ends of said members with forces of predetermined magnitude; the areas of said flat ends and said clearances being so proportioned with respect to the engaging forces applied by said means that, when said ends are engaged by said means in a selected speed changing operation, they will smoothly slide upon each other without burring, and will not manifest any appreciable tendency to intermesh until their speeds are substantially synchronized, at which time said collar and said member will intermesh without clashing or jerking.

4. In a multiple speed power transmitting assembly, a pair of spaced speed change members, an axially shiftable rotatable clutch element between said members; means for applying shifting forces to said clutch element; clutch teeth on said members and said element adapted to be selectively intermeshed with predetermined backlash; torque transmitting faces of predetermined lengths on said teeth; the end faces of each set of said clutch teeth constituting circumferentially spaced segments of a surface of revolution generated by a line rotated about the axis of said members, said torque-transmitting faces joining said end faces along sharp, non-chamfered corners, the end faces of the teeth of one member being parallel to the end faces of the teeth of the other member and having predetermined areas; said backlash, end face areas and torque-transmitting face lengths being so selected that said clutch element may be unmeshed from either of said members and brought into engagement with the other member upon relief of driving pressures and the application of predetermined shifting pressures thereto, and when the end faces of the teeth of either of said members and said clutch element are engaged with predetermined pressures and are relatively rotating in a speed changing operation, the engaged end faces will smoothly slide upon each other without manifesting any appreciable tendency to intermesh until substantially synchronized, and then the engaged teeth will intermesh without jerk or clash.

5. The power transmitting assembly defined in claim 4, together with interlocking means for preventing disengagement of said clutch element and said members until said driving pressures are relieved and said predetermined shifting pressures are applied to said clutch element.

6. The power transmitting assembly defined in claim 4, wherein said clutch element is provided with two rows of teeth of different thickness adapted to mesh and interlock with the teeth of said members thereby assuring driving engagement of the intermeshed teeth until the said driving pressures are relieved therefrom and predetermined shifting pressures are applied to said element.

7. In a multiple speed power transmitting assembly, a pair of toothed speed change members mounted for relative rotation in spaced relationship about a common axis; an axially movable toothed clutch collar rotatable about said axis between said members and adapted to mesh with either of said members; resilient means tending to move said clutch collar into engagement with one of said members with a predetermined engaging force; power operated means for moving said clutch collar against the action of said resilient means into engagement with the other of said members with a predetermined engaging force of substantially equal magnitude; said teeth having such degrees of backlash, and end faces of such relative areas and so shaped that when they are engaged by said means they will smoothly slide upon each other without burring in a common surface of revolution generated by a line rotated about a point on the axis of said members and will not manifest any appreciable tendency to intermesh until their speeds are substantially synchronized, said resilient means and said power operated means being operable to pull said collar out of mesh with said speed change members with forces of materially greater magnitude than said first-named forces.

8. In a multiple speed power transmitting assembly, a pair of spaced speed change members, an axially shiftable rotatable clutch element between said members; means for applying shifting forces to said clutch element; co-extensive clutch teeth on said members and said element adapted to be selectively intermeshed with predetermined back lash; smooth end faces on said teeth having predetermined areas, the end faces of coextensive teeth being located in a surface of revolution generated by a line rotated about a point on the axis of rotation of said members and said element, adjacent surfaces of revolution having substantially the same shape and each clutch tooth having torque transmitting faces joining its end face lying in the corresponding line generated surface along sharp, non-chamfered edges; and actuating means for engaging and disengaging said intermeshable teeth with forces bearing such predetermined relationship to said back lash and said areas that juxtaposed end faces of intermeshable clutch tooth groups will smooth slide upon each other without any appreciable tendency to intermesh until substantial synchronization is reached and, upon synchronization, will intermesh without jerk or clash.

9. The power transmitting mechanism defined in claim 8, wherein said actuating means comprises a device which exerts a shifting pressure of predetermined magnitude for engaging intermeshable clutch tooth groups and a pressure materially higher than said predetermined pressure for disengaging intermeshed clutch tooth groups.

10. In a multi-speed power transmitting mechanism for internal combustion engine-powered vehicles, an axially shiftable toothed speed control member adapted to be selectively engaged with a pair of coaxially disposed toothed speed change members by shifting it in opposite directions, the confronting end faces of said teeth being smooth and the ends of each set of teeth being contained in a surface of revolution generated by rotating a line about a point on the axis, the end faces of each set of teeth being parallel to the end faces of its mating set of teeth. the teeth of said control member and said speed change members having torque-transmitting faces joining said smooth end faces along sharp, non-chamfered edges; actuating means for shifting said control member from one position toward the other when substantially no torque is being transmitted between said members; and control means for said actuating means, movable from one position to another, for predetermining the direction of movement of said control member, said actuating means being yieldable to permit said control member to dwell in an intermediate neutral position independently of the position of said actuating means, and operable to maintain said control member in sliding engagement with the smooth end faces of the teeth of one of said speed change members with forces bearing a predetermined relationship to the areas of said confronting tooth end faces, until their speeds are completely synchronized, and operable to then intermesh the teeth of said control member with the teeth of said one speed change member without clash or shock.

11. In a multiple speed transmission, a driving shaft; a pair of axially spaced speed control members journalled on said shaft, said shaft having two rows of driving teeth intermediate said members; an axially slidable clutch collar on said shaft and having two rows of internal clutch teeth meshing with said shaft teeth; clutch teeth on said speed control members meshable with said internal teeth, the neighboring ends of said clutch teeth having smooth faces disposed parallel to each other, the end faces of each of said sets of clutch teeth being disposed in a surface of revolution generated by a line rotated about the axis of said shaft; and means for selectively shifting said collar into engagement with either of said members, with forces having a magnitude bearing such predetermined relationship to the end face area and backlash of said clutch teeth that the end faces will smoothly slide upon each other and preclude intermeshing until the speed of the shaft has been synchronized with the speed of the selected speed change member, when intermeshing will occur without jerk or clash, the axial spacing of the rows of shaft and clutch teeth being such, and the teeth of two of said rows of teeth being of such relative chordal thicknesses, that when said collar is meshed with either of said members and is transmitting power one row of teeth on said collar will be disposed slightly out of endwise registry with, and will be locked against axial movement by one of the rows of shaft teeth.

12. The transmission defined in claim 11, wherein one row of said internal clutch collar teeth is adapted to seat in the space between the two rows of shaft teeth in one shifted position of said collar.

13. In a multiple speed power transmitting mechanism, a pair of relatively axially movable speed change members mounted for relative rotation about a common axis and operable to transmit torque in both directions of rotation when they are coupled together; means for coupling said members together, comprising teeth on said members having torque-transmitting faces meshable with a predetermined degree of backlash, the confronting ends of the teeth of said members being smooth and disposed parallel to each other, the ends of each of said sets of teeth being located in a surface of revolution generated by a line rotated about said common axis, said tooth ends joining their torque-transmitting faces along sharp, non-chamfered edges; actuating means connected to one of said members and adapted to bring it into engagement with the other member with a force of predetermined magnitude and establish a pressure between said confronting tooth ends bearing such predetermined relationship to said backlash and the areas of said tooth ends that, when said members are engaged and relatively rotating in a speed change operation, said tooth ends will smoothly slide upon each other and prevent said teeth from manifesting any appreciable tendency to intermesh without clash or jerk, said actuating means also being selectively operable, after said members are intermeshed, to urge said one member away from the other with a force of materially greater magnitude than said engaging force, and rapidly bring said members out of mesh when their torque-transmitting faces are relieved of driving pressures.

14. In a variable speed driving mechanism, a shaft mounted for rotation and having an enlarged portion provided with two rows of clutch teeth; a pair of driving gears rotatably mounted on said shaft and each having a row of clutch teeth adjacent one of the rows of teeth on said enlarged portion; and a clutch collar slidable axially on said enlarged portion and having two rows of internal teeth meshable with the teeth thereof, said collar being shiftable into engagement with the clutch teeth of said gears, for coupling the latter to said shaft, one of the rows of teeth in said collar being of different thickness than the other row, whereby when said collar is engaged with the clutch teeth of said gears and is transmitting power, said collar cannot be shifted out of engagement with the clutch teeth on said gear; the adjacent ends of said teeth having smooth faces so shaped and of such relative areas and the meshing teeth having such degrees of backlash that when brought into engagement they will abut in sliding engagement in a common surface of revolution generated by a line rotated about the axis of rotation of said shaft and will slide relatively without burring and clashing while tending to synchronize and having torque transmitting surfaces joining said smooth end faces along sharp edges whereby any appreciable tendency for said teeth to undergo relative axial movement beyond said common surface of sliding engagement is precluded until their speeds are substantially synchronized.

15. The driving mechanism defined in claim 14, wherein one of the rows of teeth in said collar is so dimensioned as to fit between the rows of teeth on said enlarged portion in one shifted position of said collar.

16. The driving mechanism defined in claim 14, wherein the outer edge of at least one tooth of each row of teeth in said collar is inclined with respect to said shaft, and a detent is located in said shaft and cooperates with said inclined teeth in both shifted positions of said collar.

17. In a power transmitting assembly, a drive member; a driven member; and a clutch means operative to drivingly couple said driving member to said driven member and uncouple it therefrom comprising a pair of relatively axially shiftable members rotatable about a common axis and provided with intermeshable clutch teeth, the adjacent ends of said teeth having smooth faces so shaped and of such relative areas and the meshing teeth having such degrees of back lash that when brought into engagement they will abut in sliding engagement in a common surface of revolution generated by a line rotated about said axis and will slide relatively without burring or clashing while tending to synchronize and having torque transmitting surfaces joining said end faces along sharp edges, whereby any appreciable tendency for said members to undergo relative axial movement beyond said common surface of sliding engagement is precluded until their speeds are substantially synchronized.

18. In a power transmitting assembly, driving and driven members and an axially shiftable clutch element all rotatable about a common axis, said driving and driven elements having clutch teeth and said clutch element having teeth simultaneously intermeshable with teeth on driving and driven elements; the teeth on said clutch and driving and driven elements having smooth, juxtaposed end faces disposed in surfaces of revolution generated by the rotation of axis intersecting lines about said common rotational axis, and having torque transmitting faces joining corresponding end faces along sharp non-chamfered edges, said end faces having such predetermined areas and intermeshable teeth having such degrees of back lash that when juxtaposed tooth end faces are engaged under operative pressure and are relatively rotating, the engaged end faces will slide smoothly upon each other without manifesting any appreciable tendency to intermesh until substantially synchronized and will then intermesh without jerk or clash; and actuating means for engaging and disengaging said clutch and driven elements comprising a device which exerts a shifting pressure of predetermined magnitude for unmeshing the teeth of said clutch element from the teeth of a driven element and exerts a materially lower pressure for meshing the teeth of said clutch element with the teeth of a driven element to avoid premature intermeshing of said teeth before substantial synchronism is obtained.

19. Mechanism comprising a pair of relatively rotatable members arranged about a common axis and mounted for relative axial movement into and out of engagement with each other, and coacting teeth on said members adapted to intermesh during said engagement, the adjacent ends of said teeth having smooth faces so shaped and of such relative areas and the meshing teeth having such degrees of back lash that when brought into engagement they will abut in sliding engagement in a common surface of revolution generated by a line rotated about said axis and will slide relatively without burring or clashing while tending to synchronize and having torque transmitting surfaces joining said end faces along sharp edges, whereby any appreciable tendency for said members to undergo relative axial movement beyond said common surface of sliding engagement is precluded until their speeds are substantially synchronized.

NELSON R. BROWNYER.